March 22, 1938.  H. L. JEFFERY  2,111,857
MOLDING MACHINE
Filed April 5, 1932  14 Sheets-Sheet 1

INVENTOR
Harold L. Jeffery
BY Edward H. Cumpston
his ATTORNEY

March 22, 1938.  H. L. JEFFERY  2,111,857
MOLDING MACHINE
Filed April 5, 1932    14 Sheets-Sheet 2
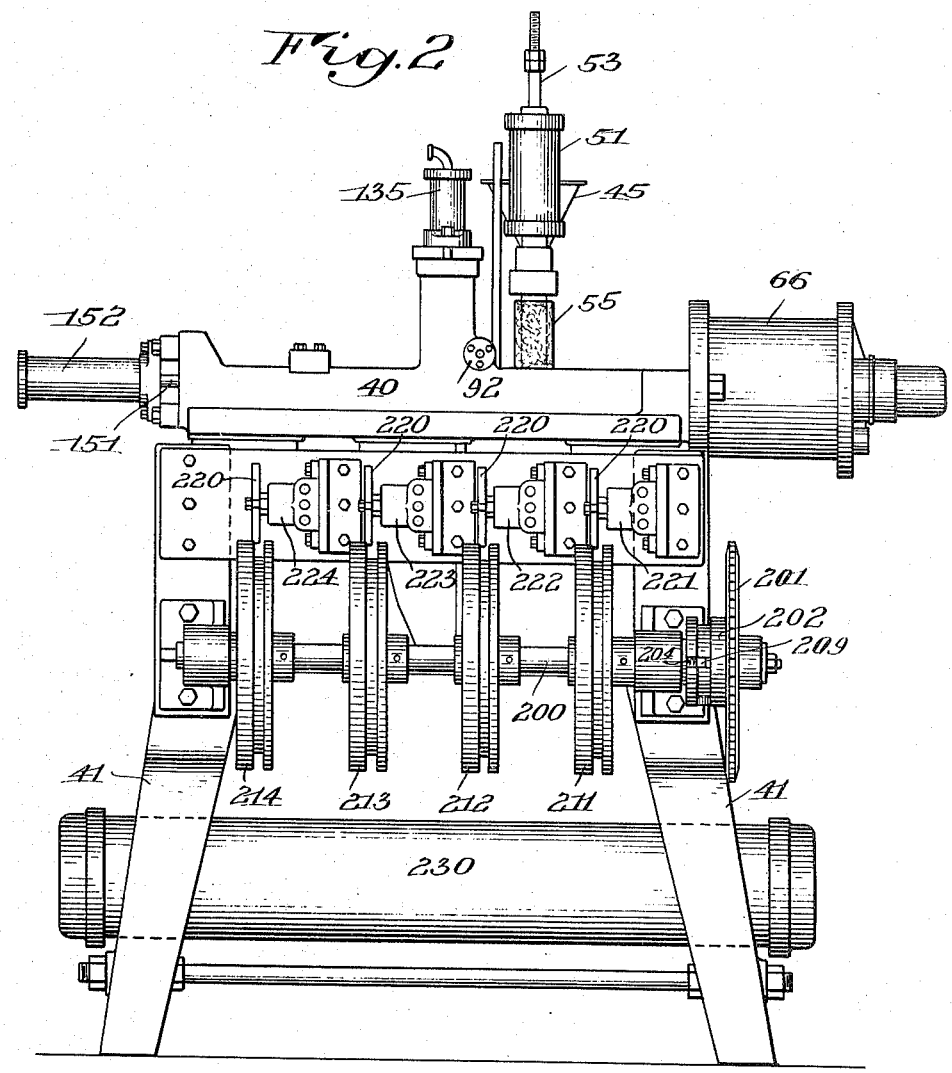
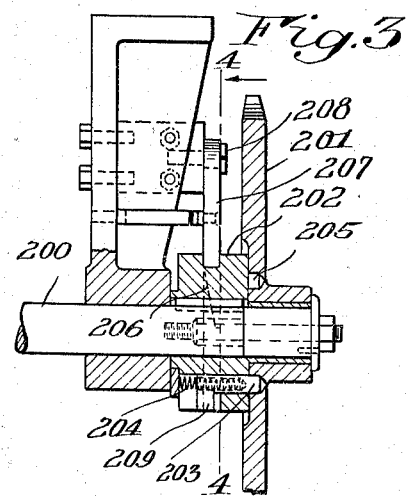
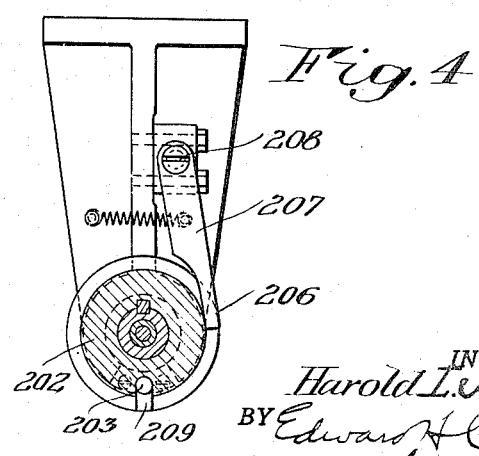
INVENTOR
Harold L. Jeffery
BY Edward H. Cumpston
his ATTORNEY March 22, 1938.   H. L. JEFFERY   2,111,857
MOLDING MACHINE
Filed April 5, 1932    14 Sheets-Sheet 3
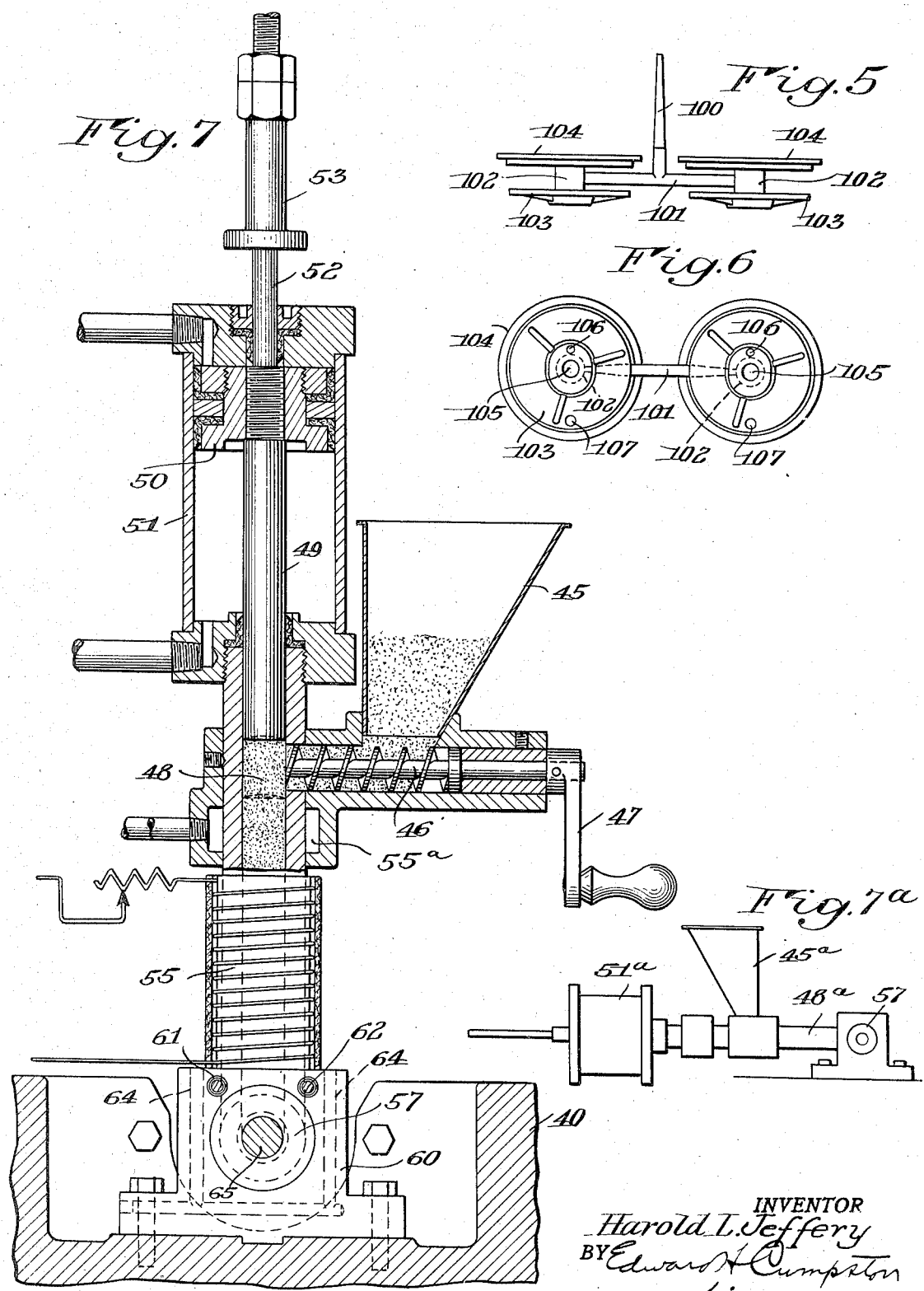
INVENTOR
Harold L. Jeffery
BY Edward H. Cumpston
his ATTORNEY

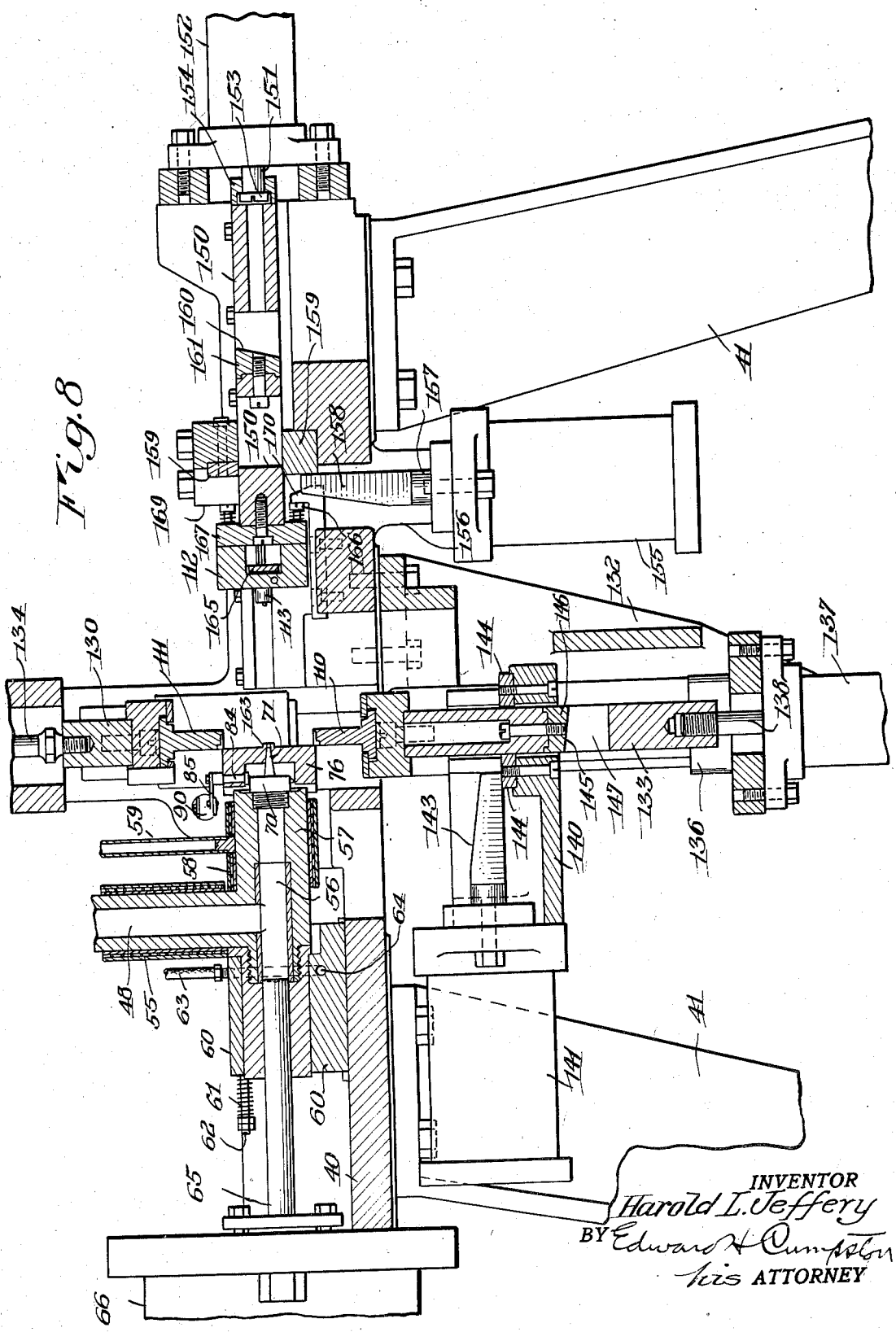

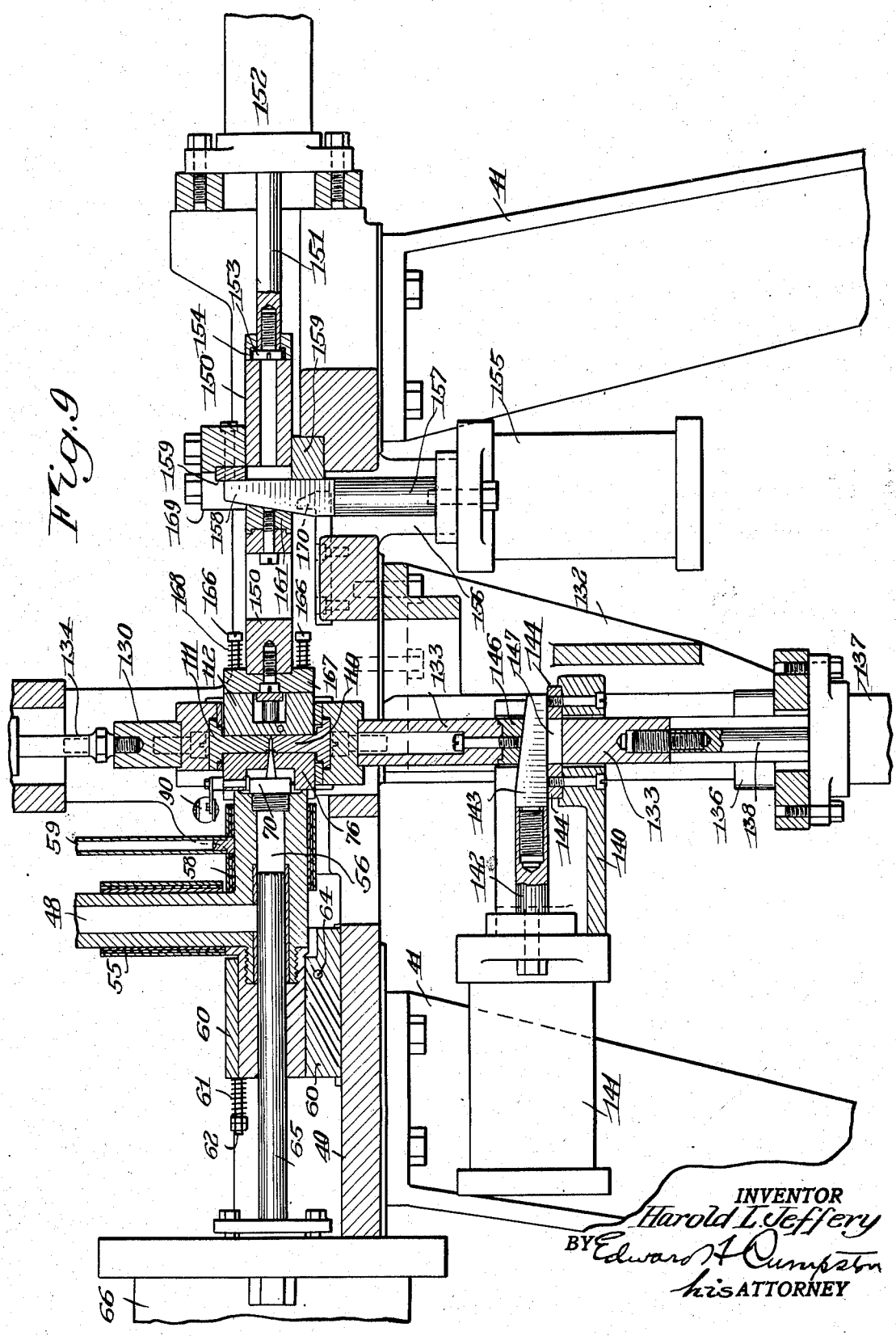

March 22, 1938. H. L. JEFFERY 2,111,857
MOLDING MACHINE
Filed April 5, 1932 14 Sheets-Sheet 6

INVENTOR
Harold L. Jeffery
BY Edward H. Cumpston
his ATTORNEY

March 22, 1938.    H. L. JEFFERY    2,111,857
MOLDING MACHINE
Filed April 5, 1932    14 Sheets-Sheet 7
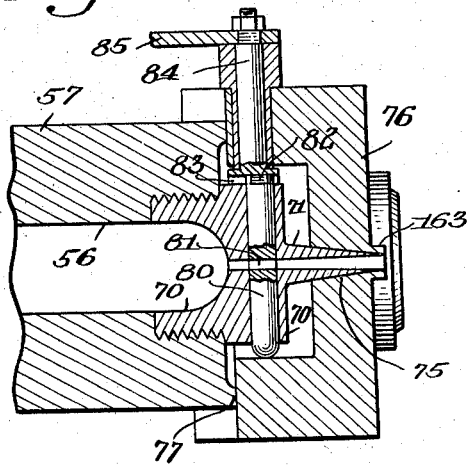
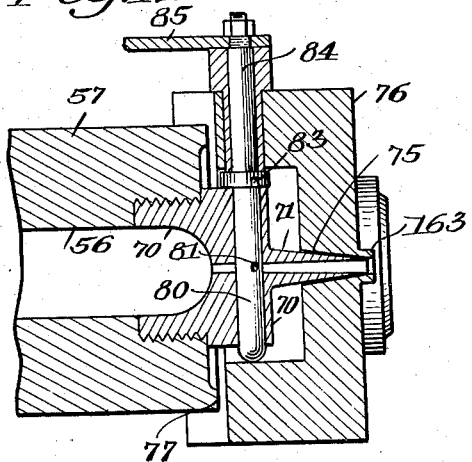
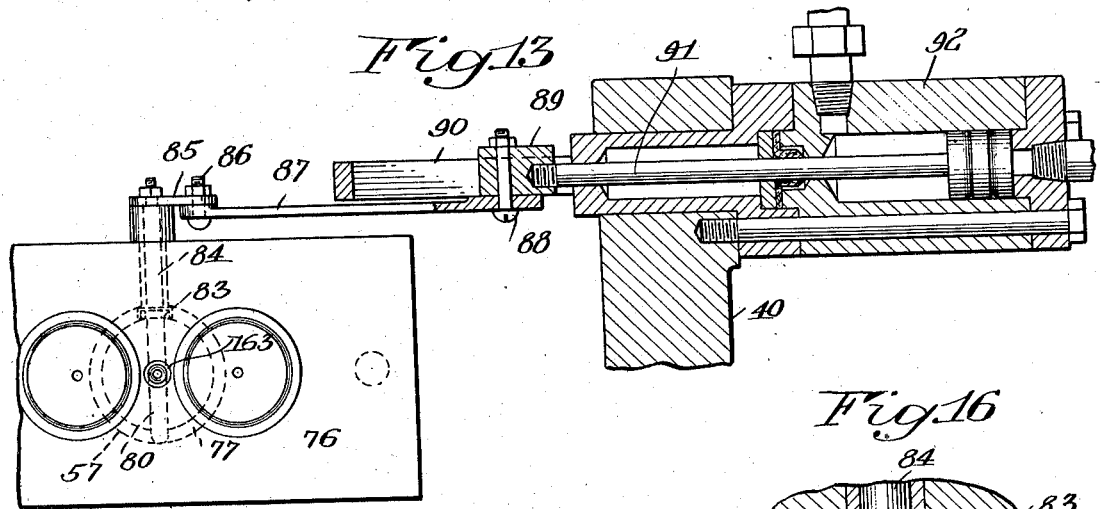
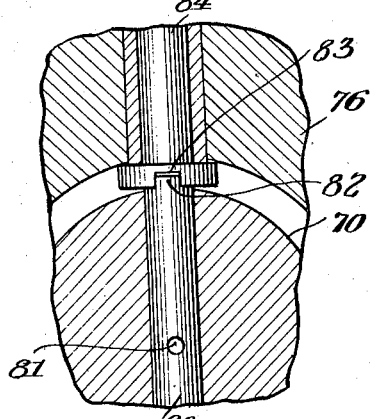
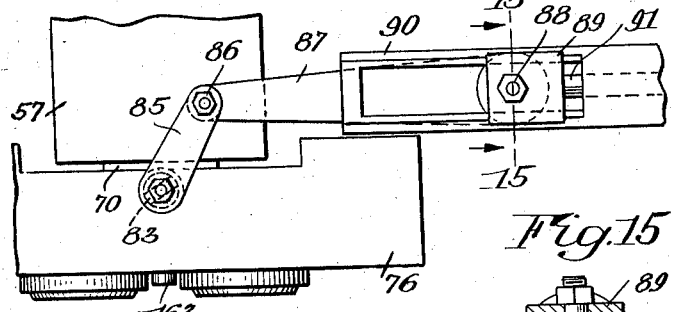
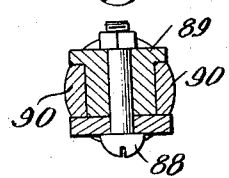
INVENTOR
Harold L. Jeffery
BY Edward H. Cumpston
his ATTORNEY

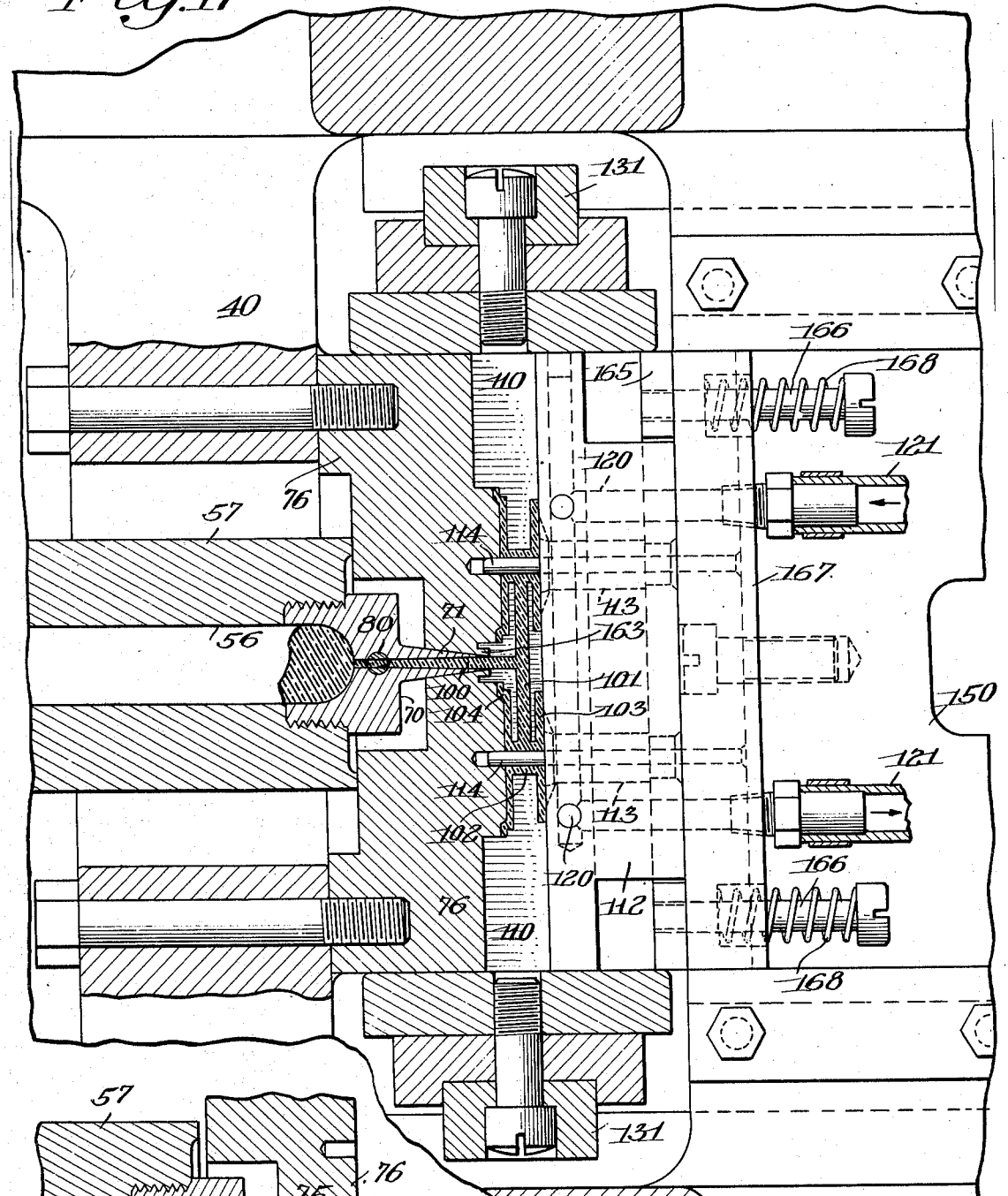

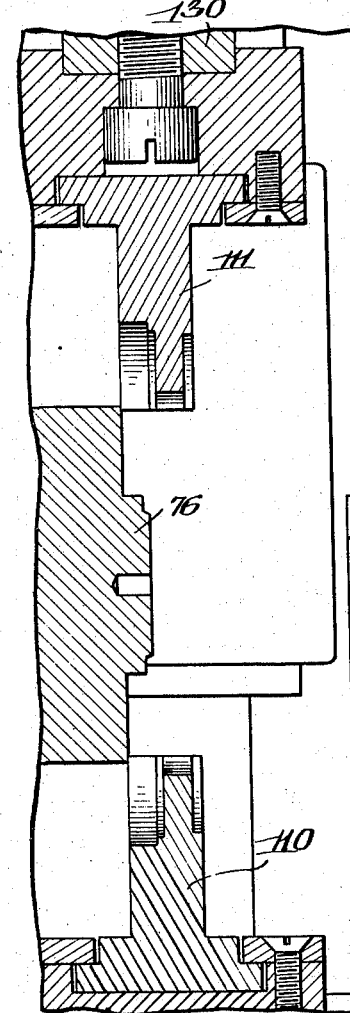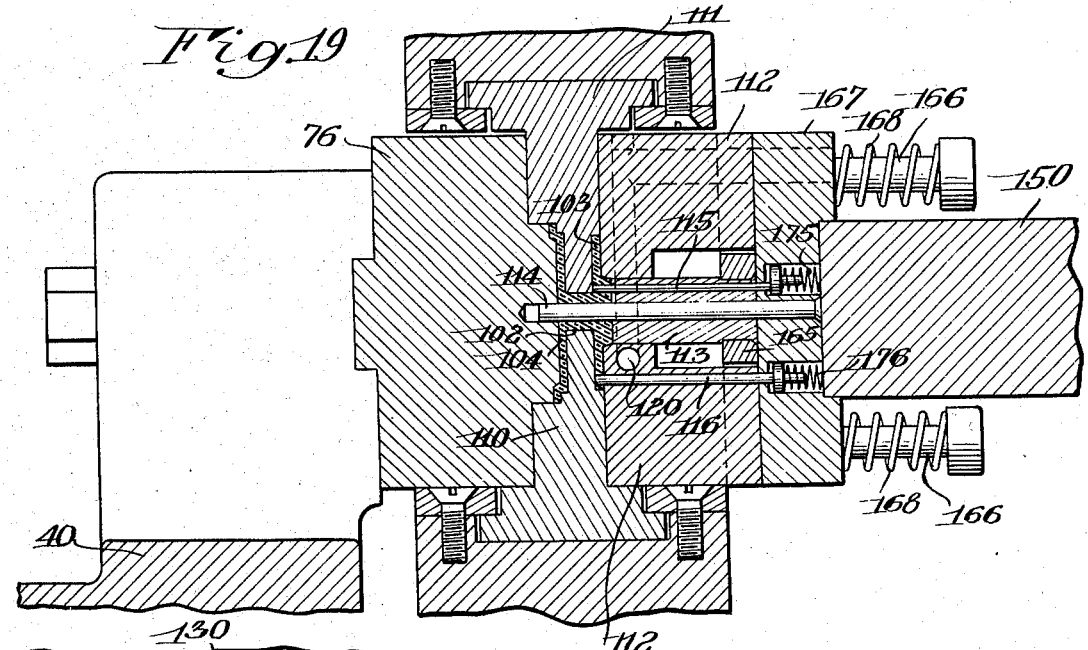

March 22, 1938.   H. L. JEFFERY   2,111,857
MOLDING MACHINE
Filed April 5, 1932   14 Sheets-Sheet 10
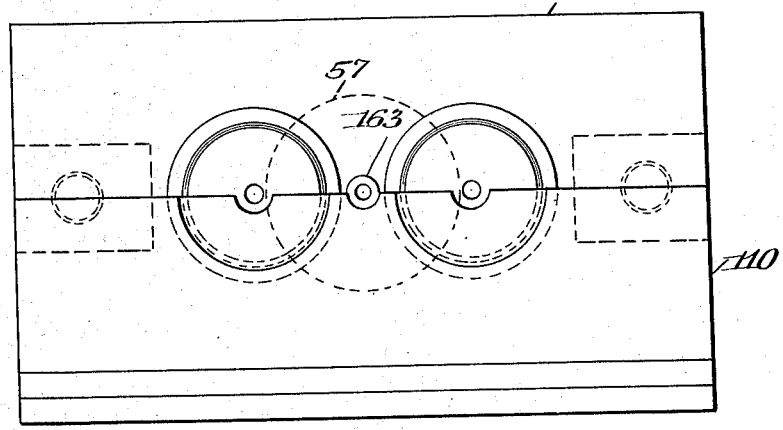
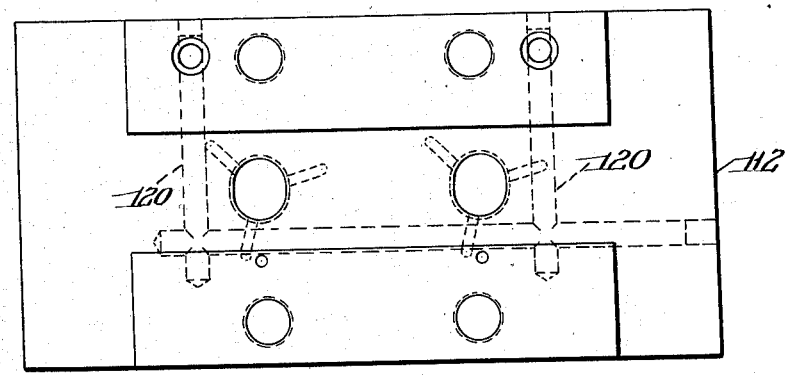
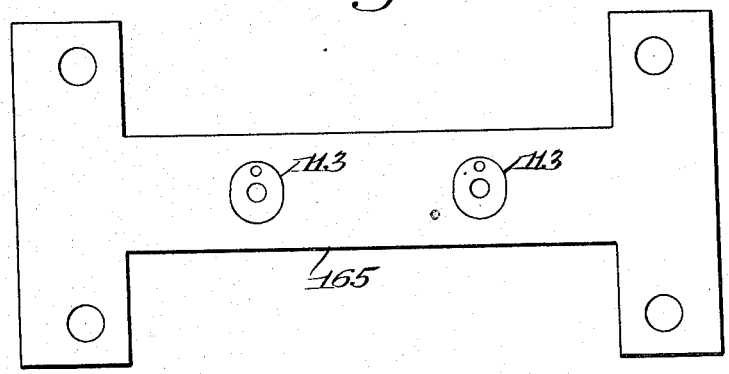
INVENTOR
Harold L. Jeffery
BY Edward H. Cumpston
his ATTORNEY March 22, 1938.   H. L. JEFFERY   2,111,857
MOLDING MACHINE
Filed April 5, 1932   14 Sheets-Sheet 11
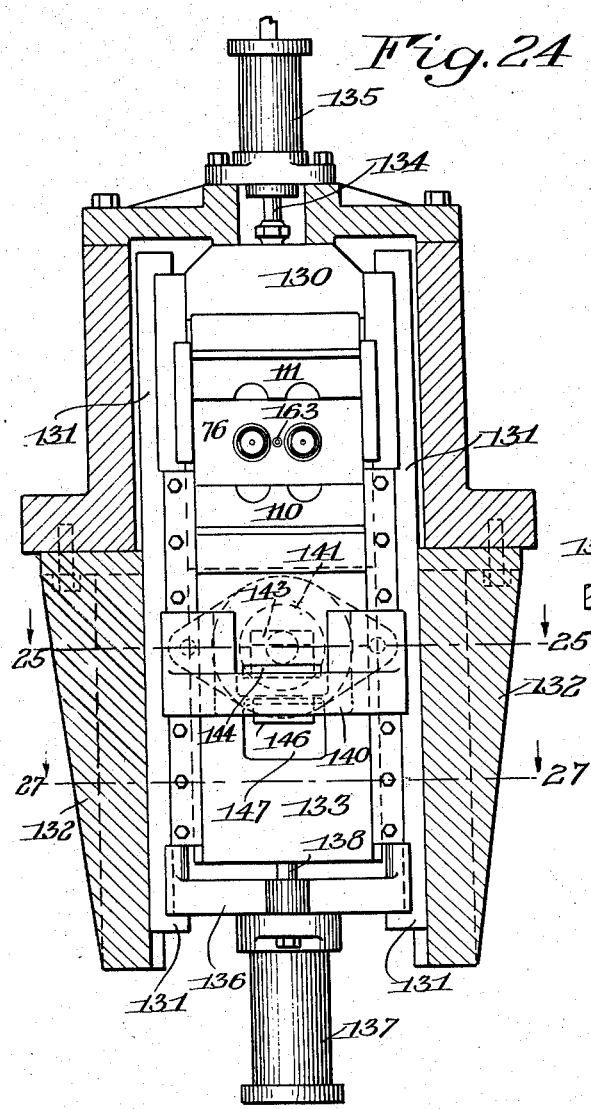
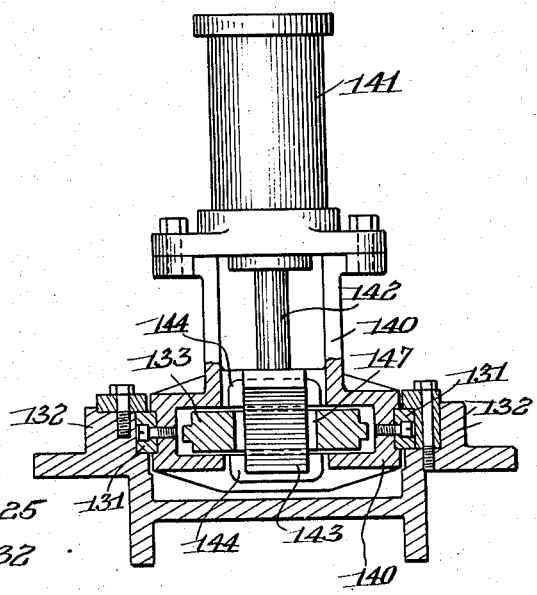
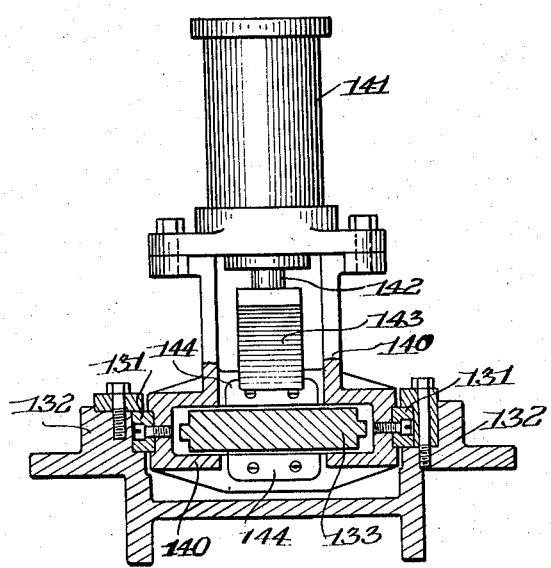
INVENTOR
Harold L. Jeffery
BY Edward H. Cumpston
his ATTORNEY

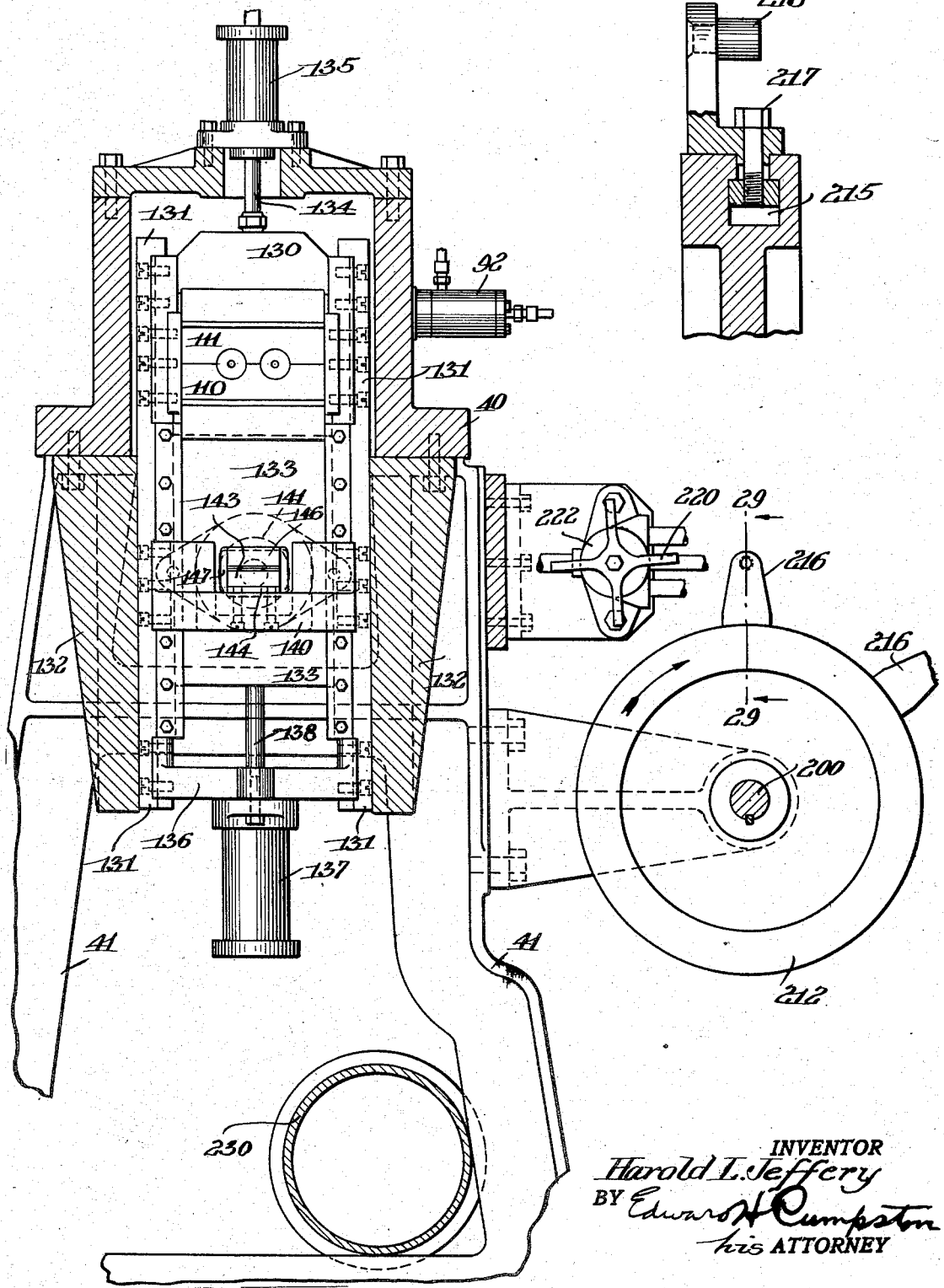
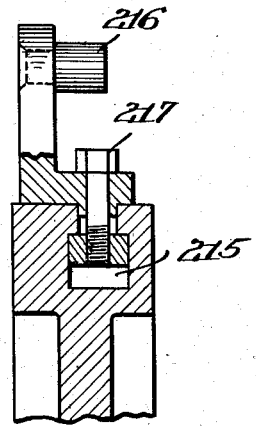

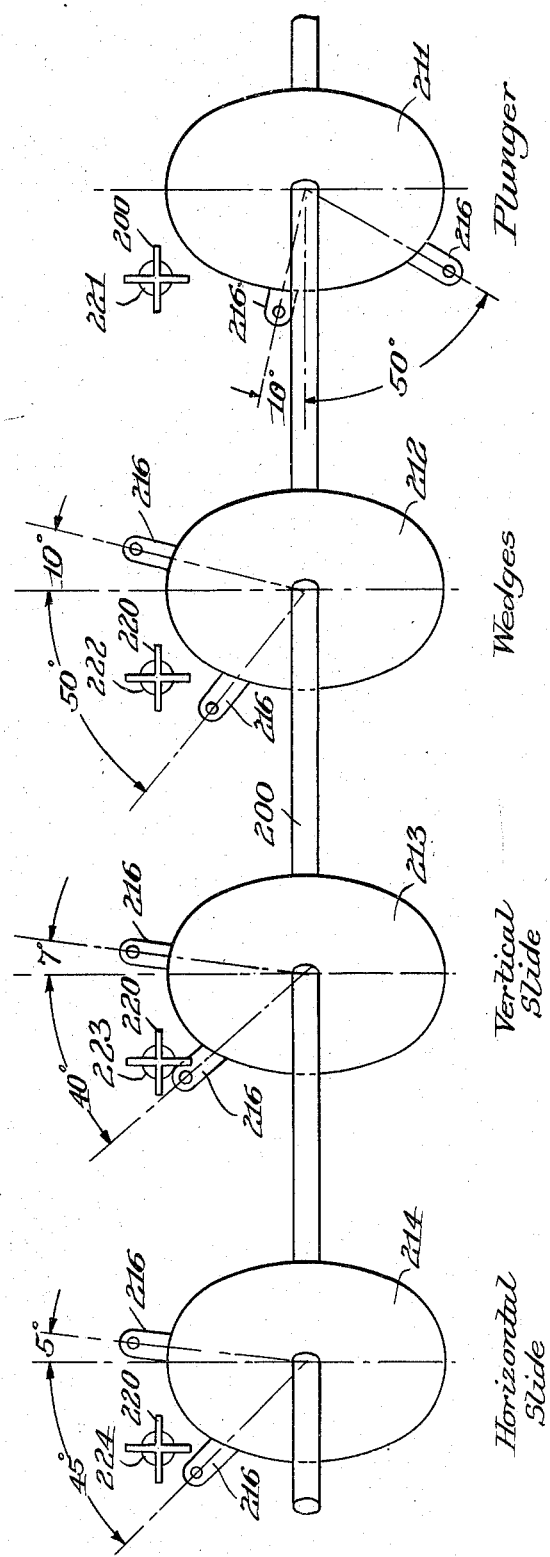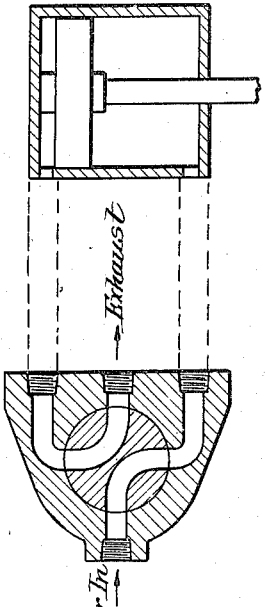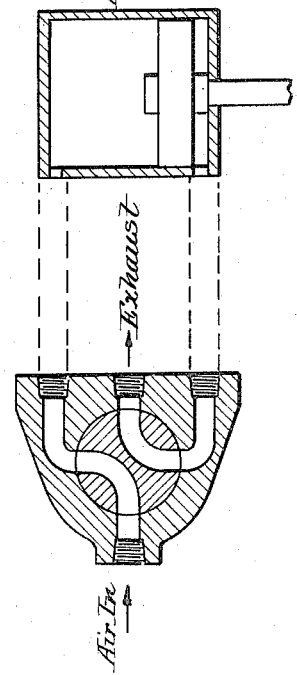

March 22, 1938.
H. L. JEFFERY
2,111,857
MOLDING MACHINE
Filed April 5, 1932
14 Sheets-Sheet 14
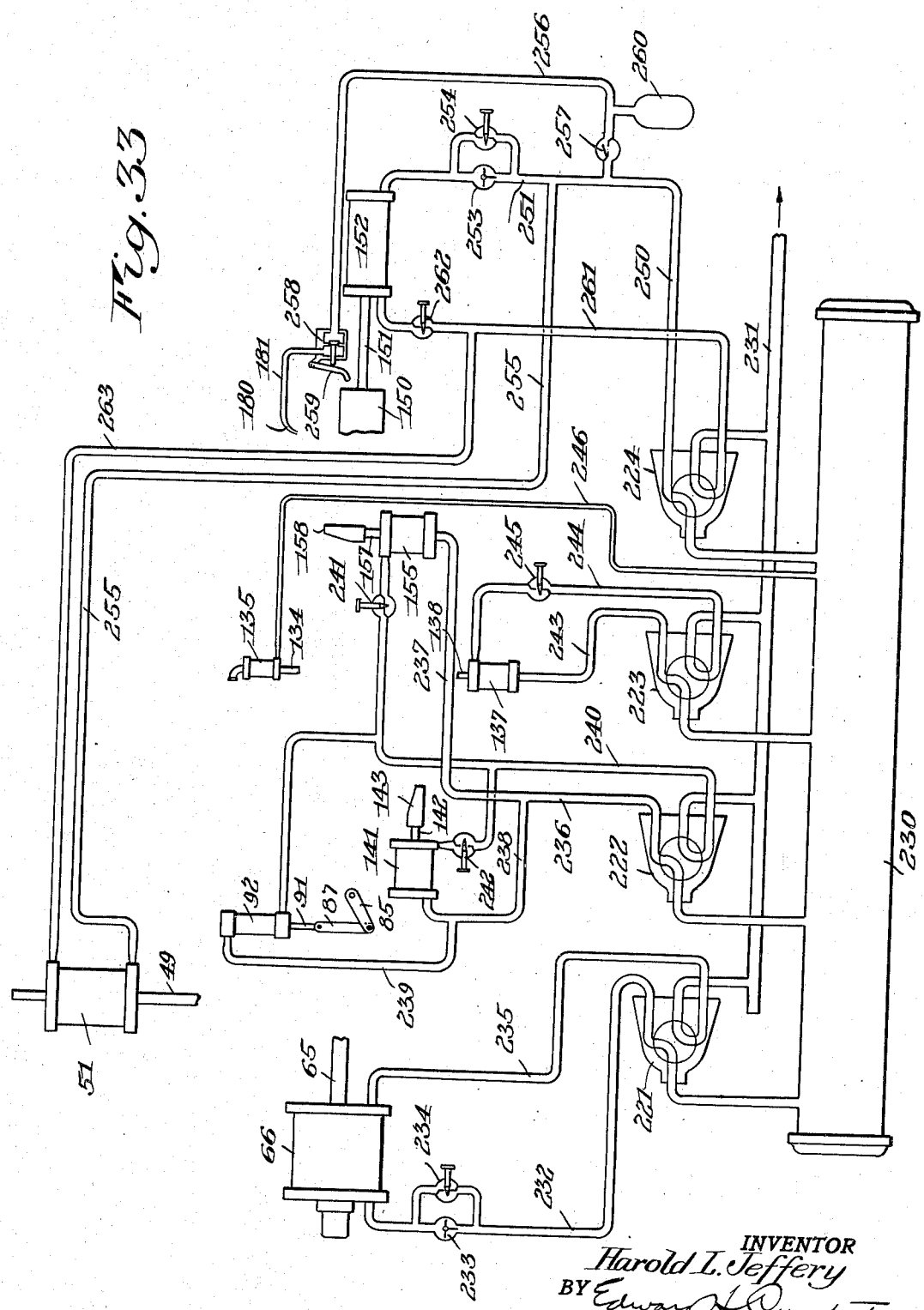
INVENTOR
Harold L. Jeffery
BY Edward H. Cumpston
his ATTORNEY Patented Mar. 22, 1938

2,111,857

UNITED STATES PATENT OFFICE 2,111,857

MOLDING MACHINE

Harold L. Jeffery, Fort Thomas, Ky., assignor, by mesne assignments, to The Grotelite Company, Bellevue, Ky., a corporation of Kentucky Application April 5, 1932, Serial No. 603,377

22 Claims. (Cl. 18—17)

This invention relates to machines for molding articles from organic plastic material or material composed of or containing as an essential ingredient a heat plasticized, organic substance, such, for example, as the acetate and other compounds of cellulose.

An object of the invention is the provision of an improved and automatic machine for molding articles from such materials without waste, and by which the danger of decomposition of the molding material is eliminated or reduced to a minimum.

Another object of the invention is the provision of a machine of this character having its parts designed and coordinated to handle the hot plastic material at optimum temperatures and pressures for producing molded articles with rapidity and in the desired stable form.

Another object is to provide such a machine having its parts operating automatically and uniformly in accordance with a definite time sequence adjustably predetermined to correspond with the particular characteristics of the material employed and the article to be produced.

Another object is the provision of such a machine in which the timing of the various movements and operations may be rapidly, easily, and minutely adjusted to obtain optimum conditions, so that all operations of the machine will harmonize perfectly and will be performed properly in accordance with the characteristics of the molding material and of the articles being molded.

Another object is the provision of a machine of the above character comprising an ample multiplicity of movable mold parts for molding a wide range of articles, together with efficient mechanism for moving said parts and securely locking the same in closed position so as to withstand a substantial molding pressure.

Another object is to afford a readily controlled and precisely operating fluid pressure means for automatically actuating the machine parts.

Another object is the provision of improved means for feeding and injecting the material into the mold, with efficient control of its temperature and plasticity and without wastage.

A further object is the provision of a more reliable article ejecting means and various other improvements in features and details of construction and operation affording adaptability and speed in production and a satisfactory quality of the molded article.

A still further object is the provision of a machine embodying improvements over the machine disclosed in United States Patent No. 1,810,126, issued June 16, 1931, for an invention of Hermann Buchholz and assigned to the assignee of this present application.

To these and other ends the invention resides in certain improvements and combinations of parts, all as will be hereinafter more fully described, the novel features being pointed out in the claims at the end of the specification.

In the drawings:

Fig. 2 is a rear elevation of the same;

Fig. 3 is a longitudinal horizontal section through a clutch forming part of the machine;

Fig. 4 is a transverse section through the clutch taken substantially on the line 4—4 of Fig. 3;

Fig. 5 is an edge view of two joined articles molded by the machine in a single operation thereof;

Fig. 6 is a plan of the same articles;

Fig. 7 is a vertical section through part of the feeding mechanism of the machine;

Fig. 7a is a diagrammatic view illustrating a modification of the parts shown in Fig. 7;

Fig. 8 is a vertical sectional view taken longitudinally through the machine substantially along the center line thereof, showing the mold in open position;

Fig. 9 is a similar view with the mold in closed and locked position;

Fig. 11 is a fragmentary vertical section through the feeding nozzle and associated parts, showing them in position for injecting material into the mold;

Fig. 12 is a similar view with the mold retracted to a non-injecting position;

Fig. 13 is an elevation with parts in vertical section of the mechanism for operating a valve in the nozzle;

Fig. 14 is a plan of part of the mechanism shown in Fig. 13;

Fig. 15 is a vertical section taken substantially on the line 15—15 of Fig. 14;

Fig. 16 is a transverse vertical section through part of the mechanism shown in Fig. 12, illustrating the connection between the nozzle valve and its operating mechanism;

Fig. 17 is a horizontal section through the mold and associated parts illustrating an article being molded therein;

Fig. 18 is a fragmentary view of some of the parts shown in Fig. 17 illustrating the nozzle retracted to a non-injecting position;

Fig. 19 is a vertical sectional view through the mold in closed position;

Fig. 20 is a similar view of the mold in open position, illustrating part of the ejecting mechanism;

Fig. 21 is an elevation or face view of part of the mold;

Fig. 22 is a rear view of another part of the mold;

Fig. 23 is a front view of an ejector carrier associated with the mold;

Fig. 24 is a vertical section taken transversely through part of the mold operating mechanism, illustrating the mold in open position;

Fig. 25 is a horizontal section substantially on the line 25—25 of Fig. 24;

Fig. 26 is a view similar to Fig. 25 with the parts in a different position;

Fig. 27 is a horizontal section taken substantially on the line 27—27 of Fig. 24;

Fig. 28 is a view similar to Fig. 24 with the parts in a different position, illustrating the mold closed;

Fig. 29 is a fragmentary sectional view illustrating details of the controlling mechanism for the machine, the section being taken substantially on the line 29—29 of Fig. 28;

Fig. 30 is a diagrammatic view of a pneumatic cylinder and its control valve, in one position;

Fig. 31 is a similar view with the piston and valve in another position;

Fig. 32 is a diagrammatic view illustrating the relative positions of the control cams, and Fig. 33 is a diagram illustrating the piping connections to the control valves and pneumatic cylinders.

The same reference numerals throughout the several views indicate the same parts.

Figure 1:
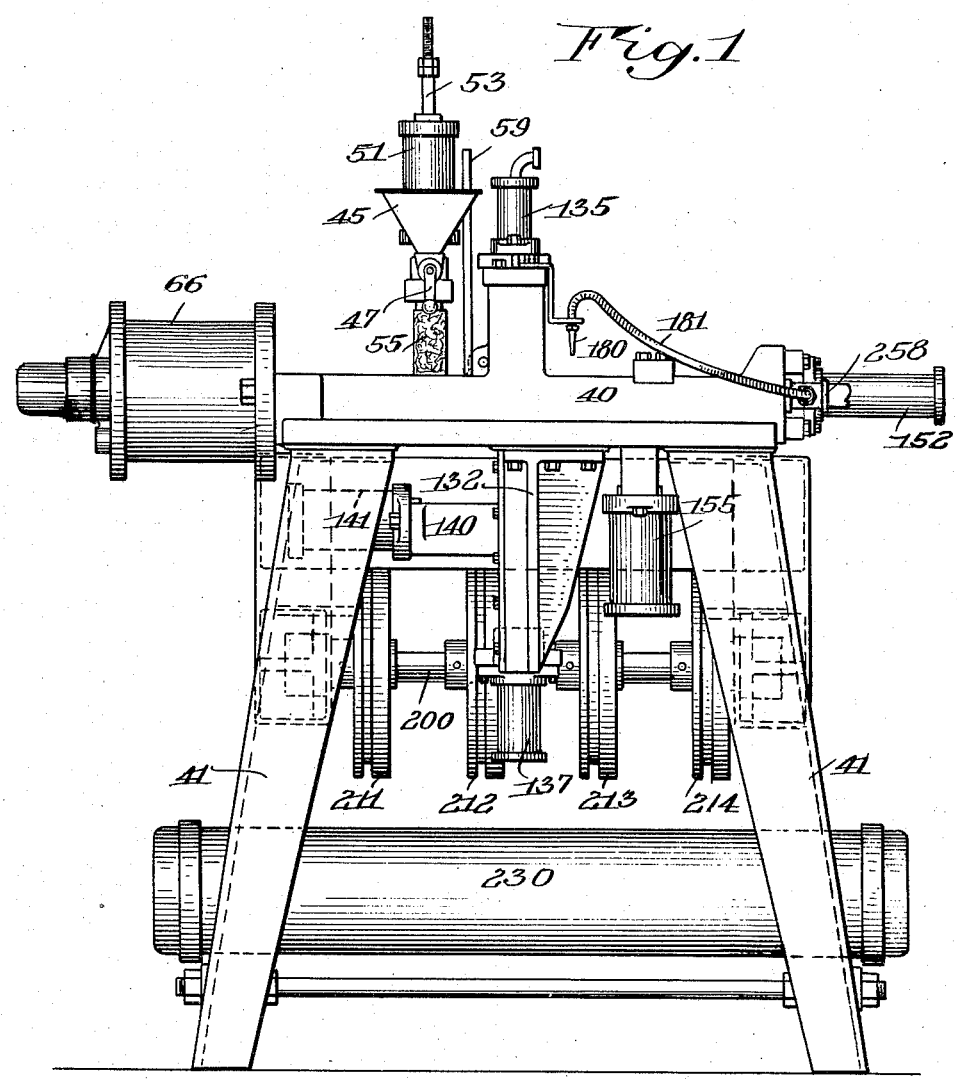
Fig. 1 is a front elevation of a machine constructed in accordance with a preferred embodiment of the invention.

The present machine is particularly adapted for molding articles from organic plastic material, such for example as cellulose acetate. Many organic plastic materials (including cellulose acetate) are easily decomposed, as for example by too prolonged or too great heating, and must, therefore, be handled and worked with great care. The present invention provides a machine which may be used with entire satisfaction in molding articles rapidly and accurately from organic, plastic materials, including those of the easily decomposed character above mentioned.

By the use of this machine, the organic material is moved progressively forwardly toward a discharge orifice such as a nozzle, and is progressively heated as it moves, the movement and the heating being carefully regulated and timed in proportion to the rate of use of the material so that the organic material is brought to the proper plasticity or fluidity substantially at the moment it reaches the discharge orifice and is about to be injected into the mold. In this way, premature heating and too great heating, either of which might result in decomposition of the organic material, are avoided, and the material is heated to just the right extent to be workable under optimum conditions.

This progressive heating of the molding material has the further important advantage that the material does not become fluid until it is relatively close to the discharge orifice or nozzle; consequently the means for advancing the material and injecting it into the mold may operate upon the material while it is still in a relatively solid or stable state, such as powder or the like, in which condition the molding material can be handled much more easily and advantageously than when it is fluid or semi-fluid. When the advancing or injecting means is in the form of a plunger or the like, it is apt to be clogged and greatly impeded by contact with plastic or fluid molding material, whereas when the plunger operates upon powder or other solid molding material, it does not become clogged and continues to operate satisfactorily.

The molding material, having been brought to the proper degree of plasticity as above outlined, is discharged from the heating chamber and injected into the mold at periodic intervals carefully timed and synchronized with relation to the rate of progressive heating of the material, so that the material is used up just as fast as it is made ready to be used. Thus there is no oversupply of prepared molding material which might become decomposed while waiting to be injected into the mold, and no waste.

The periodic injections of material into the mold, as well as the subsequent openings of the mold to discharge the molded articles, are effected or controlled automatically by mechanical timing means, so that once the machine has been properly adjusted and set into operation, the cycle of operation is accurately repeated over and over again with exactly the same timing. This is an important feature, since it eliminates accidental variations in the cycle which might result in faulty operation or imperfect articles. Furthermore, provision is made for rapid and easy adjustment of the cycle of operation, so that it may be changed from time to time to secure optimum conditions. Changes in the cycle of operation might be necessitated, for example, by changes in the character of molding material employed, or by changes in the size or character of the articles being molded.

Another noteworthy feature of this invention is that the molding material is heated preferably in a plurality of heating chambers rather than in only a single chamber. The above mentioned progressive movement of the molding material is preferably a movement progressively and successively through at least two chambers, in each of which it is progressively heated. When the partially heated material is moved from one chamber into the other, the grains of powder or other particles of the material become stirred up and rearranged, so that different particles are likely to come into contact with the heating walls of the second chamber, which is of advantage because the molding material is usually a poor conductor of heat. This arrangement is especially serviceable where large volumes of molding material must be prepared.

The machine of the present invention, when kept supplied with a suitable quantity of molding material, continues to operate entirely automatically. It is effective to prepare or condition the molding material, close the mold, inject a suitable quantity of properly conditioned molding material into the mold, open the mold after the proper holding period, and eject the molded article, all automatically in adjustably predetermined timed sequence, and to repeat this cycle over and over again indefinitely at will. Many suitable organic plastic materials, such for example as the acetate and certain other compounds of cellulose, require no curing or baking treatment, but are capable of solidifying rapidly in permanent finished form when injected under pressure into a mold which is relatively unheated or artificially cooled. The present invention is of particular advantage when used with molding materials of this character.

Referring now to the drawings, and particularly to the general views in Figs. 1 and 2, the machine comprises a suitable frame or body 40 supported on legs or standards 41. The left hand end of the machine when viewed from the front as in Fig. 1 is the feed or injecting end of the apparatus, and will be first described, referring particularly to Figs. 7 and 8.

The organic plastic material such, for example, as cellulose acetate, preferably in solid form such as chips, granules, or powder, is placed within a hopper 45 from which it may be fed horizontally by a screw conveyor 46 operated from a handle 47 into a vertical cylindrical bore 48. In the upper end of this cylindrical bore 48 is a plunger 49 secured to a piston 50 in a fluid pressure cylinder 51 which is preferably operated pneumatically. The plunger 49 extends beyond the piston 50 to the exterior of the cylinder, as shown at 52, and may be there provided with a stop member 53 for limiting the downward movement of the plunger 49 under the influence of pressure in the cylinder 51 above the piston, if such limitation is desired. The stop member 53 may be omitted when it is desired to have the plunger 49 move as far as possible at each stroke.

When the solid material is fed from the hopper into the chamber 48, the plunger 49 forces it downwardly into the lower part of this chamber, where the material becomes heated by suitable heating means 55 surrounding the lower part of the chamber 48. This heating means preferably is in the form of an electric heater as indicated in Figs. 7 and 8, provided with a suitable control for varying the heat as desired, of any known and suitable form such as the rheostat indicated in Fig. 7. Above the heater 55 is a water cooling jacket 55a surrounding the chamber 48, to prevent conduction from the heater of sufficient heat to soften the material in the discharge passageway of the hopper 46, which might impede free feeding of the material into the chamber 48.

The lower end of the chamber 48 opens into a horizontal chamber 56 in a block 57. Other heating means, preferably also electrical, surrounds the block 57 as indicated at 58, and is provided with a suitable control for varying the heat as desired independently of the heater 55. Preferably the two heaters 55 and 58 are adjusted to heat the molding material gradually and successively as it moves through the chambers 48 and 56, so that it will reach just the right temperature and have just the right fluidity or plasticity at the instant it is injected into the mold through the nozzle hereafter described.

To aid in controlling the heating of the molding material, there are provided suitable means such as pyrometers or thermometers for indicating the temperatures at various points in the chambers 48 and 56. For example, if thermometers are to be used, they may be placed in tubes at various points, similar to the tube 59 shown in Fig. 8 as rising from the block 57.

In molding various organic materials, the matter of temperature is often critical, as previously indicated. Therefore it is an important feature of this invention to provide the separately controlled heaters 55 and 58 and temperature indicating means such as thermometer tubes 59 so that the temperature of the molding material may be accurately observed, controlled, and maintained. The machine works entirely automatically, and the ability to control the temperature and adjust it accurately in accordance with the speed and rate of use of the molding material, is an important factor in the successful operation of an automatic machine of this kind.

As an alternative construction, instead of having the chamber 48 vertically arranged, it may be placed horizontally, extending laterally from the chamber 56 as shown diagrammatically at 48a in Fig. 7a. The dry molding material may be placed in a hopper 45a above the chamber 48a, so that it will fall automatically by gravity into the chamber when the plunger is withdrawn by the cylinder 51a. This renders the screw conveyor 46 unnecessary. Otherwise the construction may be substantially the same as previously described, the chambers being provided with heating means, water jacket, pyrometers or thermometers, etc., as before.

Figure 10:
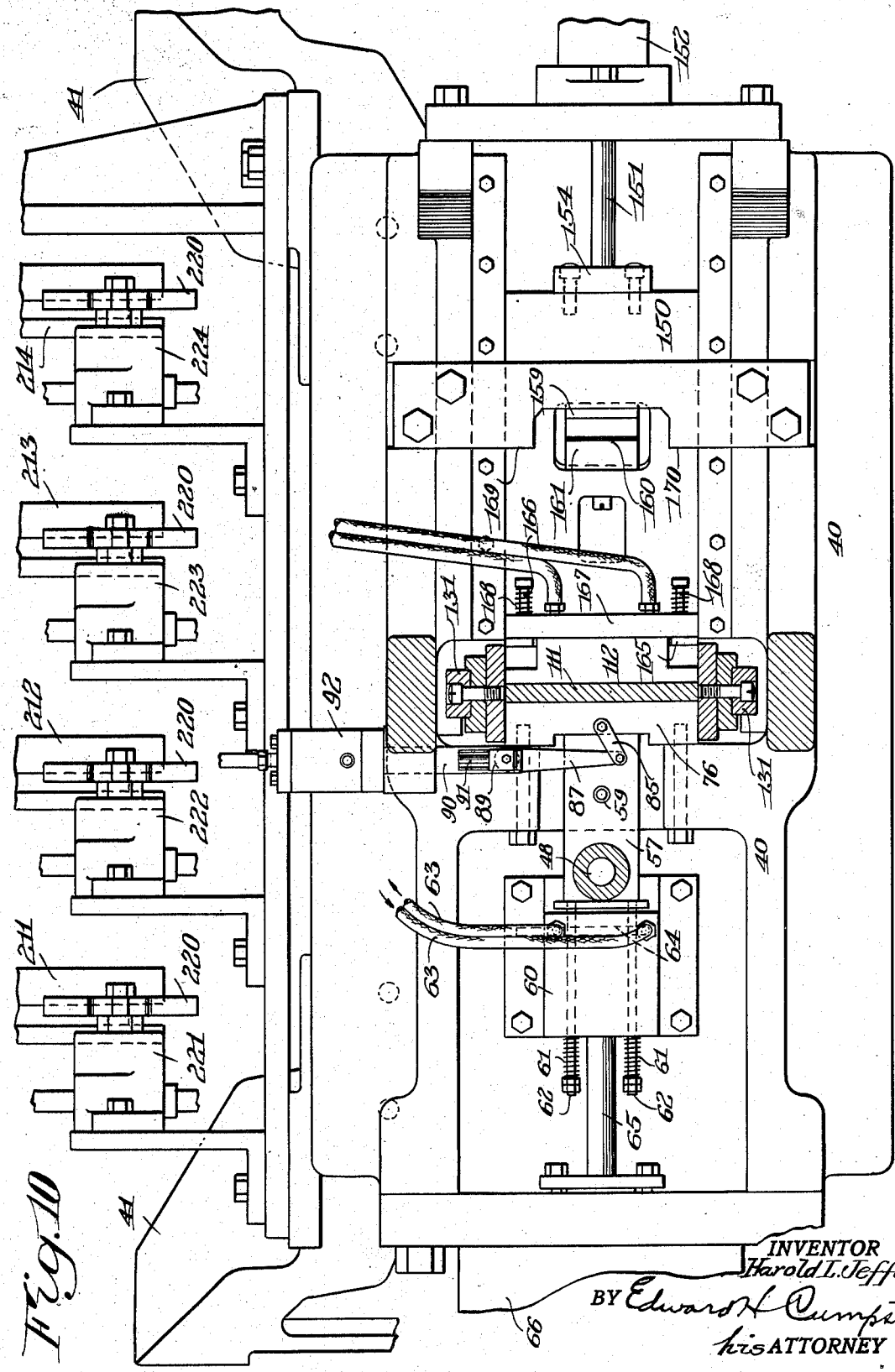
Fig. 10 is a fragmentary plan of the machine with parts in horizontal section.

The block 57 is slidably mounted in guideways in a block 60 mounted on the frame member 40 of the machine, so that it may be moved backward and forward longitudinally of the machine to a limited extent. Springs 61 surrounding rods 62 secured to the block 57 and pushing against the block 60, tend constantly to move the block 57 leftwardly to the limit of its motion. The left hand portion and any other desired part of the block 60 may be artificially cooled in any suitable way, such as by circulating cold water from the hose 63 (Fig. 10) through the passages 64 (Figs. 7 and 8).

Mounted for reciprocation within the chamber 56 is a feeding plunger 65 connected to a suitable piston within the fluid pressure cylinder 66, operated preferably pneumatically.

When the fluid pressure cylinder 66 is operated to move the plunger 65 forwardly, or rightwardly when viewed from the direction of Figs. 1 and 8, the first part of the movement of the plunger, by pressing upon the plastic material within the chamber 56, causes a slight rightward or forward movement of the block 57, sliding it in the block 60 against the action of the springs 61. Then further movement of the plunger 65 puts the fluid plastic material within the chamber 56 under great pressure and forces or sprays a portion of this material out through one or more nozzles at the right hand end of the chamber and into the mold. When the plunger 65 is retracted, the block 57 is permitted to retract slightly under the influence of the springs 61.

The nozzle and its associated parts are best shown in Figs. 11 to 17 inclusive. The nozzle is formed on a plug 70 screwed into the end of the block 57 in which the chamber 56 is formed, so that if the nozzle should become worn out or damaged, it may be easily removed for replacement or repair. The nozzle itself, indicated at 71, projects forwardly or rightwardly from the plug 70. The discharge aperture through the nozzle is of relatively restricted size, so that the molding material will flow through the aperture only under considerable pressure. The pressure used, in combination with the small size of the aperture, results in making the molding material still more fluid as it passes through the nozzle, so that it is of the proper consistency at the instant of injection into the mold. The nozzle passageway is internally tapered to expand slightly toward its discharge end, as shown clearly in Figs. 11 and 17, and externally it is tapered to contract toward its discharge end, as plainly illustrated in the same figures, so that toward the discharge end the walls of the nozzle are extremely thin. This is an important feature, since it permits the walls of the nozzle to be slightly compressed and contracted, as more particularly brought out below.

The nozzle cooperates with an internally tapered filling orifice 75 in a block 76 forming part of the mold in which the plastic material is molded. This orifice 75 has an internal taper which is substantially the same as or very slightly greater than the external taper of the nozzle 71, so that if the nozzle is forced into the orifice, it will be compressed by the wedging action of the tapered walls of the orifice and will be slightly contracted thereby. The compression and contraction of the nozzle towards its discharge end is slightly greater than that toward the middle of the nozzle, partly because of the thinner walls at the discharge end, and partly because the taper of the orifice 75 may be slightly greater than that of the nozzle, as above described.

The compression of the nozzle by forcing it into the orifice in this manner actually results in contraction of the diameter of the nozzle. Of course, such contraction is exceedingly minute and could not be detected with the naked eye, but nevertheless under the large pressures used in the present machine, the contraction of the nozzle is sufficiently great so that the subsequent expansion of the nozzle aids materially in freeing the plastic material remaining within the nozzle. It will be remembered that the nozzle is internally tapered to expand toward the discharge end, and this taper, together with the slight expansion of the nozzle when it is retracted from the orifice 75, makes it easy to withdraw from the nozzle the plastic material remaining and solidified therein after each injection of material into the mold.

The block 57 is shaped so as to have a shoulder 77 (Fig. 11) to contact with the mold block 76 when the chamber 57 is moved rightwardly by the plunger 65. This contact limits the extent to which the nozzle may be forced into the orifice, and avoids breakage or other damage to the thin delicate walls of the nozzle, while permitting sufficient movement of the parts so that the desired compressing and contracting effect on the nozzle is obtained. The position of the parts with the nozzle forced into the orifice is shown in Fig. 11, while Fig. 12 shows the same parts with the block 57 and nozzle 71 retracted under the influence of the springs 61 after the plunger 65 has been moved back, so that the nozzle may expand to its original size.

This forward thrusting and subsequent retraction of the nozzle also has another function and purpose in addition to the desired contraction and expansion of the nozzle. It will be remembered that the block 57 containing the plastic material chamber 56 is heated by a heater 58 to maintain the plastic material at the proper temperature. It has also been mentioned that the mold itself was relatively unheated, and it may or may not be artificially cooled. When the nozzle 71 is retracted to the position shown in Figs. 12 and 18, for example, it is out of substantial direct contact with the mold block 76, and consequently the nozzle becomes heated up by conduction of heat from the block 57, so that it is ready for the next injection of plastic material. Then when the nozzle is thrust forward to the position of Figs. 11 and 17, the heated and fluid plastic material keeps the nozzle sufficiently hot so that the material continues to flow through it, but as soon as the flow ceases the nozzle rapidly cools off by conduction of the heat of the nozzle into the cooler mold block 76 with which the nozzle is then in close and intimate contact. This cooling of the nozzle aids the rapid solidification of the plastic material in the nozzle, so that it acts as a dam against the fluid plastic material in the chamber 56. Then when the nozzle is once more retracted to the position of Figs. 12 and 18, the slight expansion of the nozzle and the internally tapered shape thereof permit the solidified plastic material to be easily withdrawn from the nozzle, and the nozzle heats up ready for the next injection.

In many instances it is found in practice that the solidification of the plastic material within the nozzle, as above described, acts as a sufficient dam in actual practice so that no valve in the nozzle is needed. Also the fluid plastic material may be sufficiently viscous so that it will not run out through the restricted orifice of the nozzle except when pressure is applied by the plunger 65. In some instances, however, it may be desired to provide a valve in the nozzle for positively cutting off the supply of fluid material at the end of each injecting operation, and such a valve may conveniently be formed and operated in the manner illustrated in Figs. 11 to 18 inclusive.

The nozzle valve, when employed, preferably comprises a valve plug 80 rotatably mounted in the member 70 intersecting the nozzle passageway and having a port 81 extending through the plug so that by turning the plug to a suitable position, as shown in Figs. 11 and 17, the port will permit uninterrupted flow of the material through the nozzle. By turning the valve plug 80 to a different position, such as shown in Figs. 12 and 18, the valve port 81 is moved out of alinement with the nozzle passageway and the valve is closed.

For moving this valve to open or close it, the upper end of the valve is flattened on two opposite sides to provide a tongue or rib 82, best shown in Fig. 16, which fits slidably in a groove 83 in the bottom of a rotatable member 84 which is journaled in the mold member 76 and which has a crank arm 85 fixed to its upper end. The crank arm 85, in turn, is secured by the pivot bolt 86 to a link 87 pivoted at 88 to a cross-head 89 slidable back and forth in cross-head guides 90 (Figs. 13, 14, and 15). The cross-head 89 is attached to a piston rod 91 secured to a suitable piston within a fluid pressure cylinder 92 preferably operated by pneumatic pressure.

When the piston rod 91 is retracted to the position shown in Figs. 13 and 14, the groove 83 extends obliquely with respect to the direction of movement of the block 57, the valve is closed, and the valve 80 is then always in alinement with its operating shaft 84. When the cylinder 92 is operated to thrust the piston rod 91 outwardly, however, the shaft 84 and valve 80 are rotated so that the groove 83 then extends parallel to the direction of movement of the block 57. The valve is then open, and the block 57 and nozzle 71 may be thrust forward from the position shown in Fig. 12 to the position shown in Fig. 11 without damage to the parts, since the tongue 82 on the nozzle valve may slide longitudinally in the groove 83.

The mold or die itself may have many different forms depending upon the articles which are to be molded. The present invention is embodied, by way of example, in a machine for molding winding spools or bobbins for coils used in radio apparatus and the like, and accordingly the mold here illustrated by way of example is of suitable shape for making such articles. Obviously if other articles are to be molded, the mold or die may vary in number and arrangement of parts and in its opening and closing movements and operating mechanism.

The spools or bobbins above mentioned may conveniently be made in pairs, one pair or two spools being molded at each operation of the machine. Such a pair of spools is shown in Figs. 5 and 6 of the appended drawings, in which 100 is the gate portion of the molded article which is withdrawn from the nozzle after the article is molded, and 101 is a connecting portion leading from the portion 100 to each of the spools, each of which has a central substantially cylindrical portion 102, a circular flange 103 at one end of the portion 102, and another circular flange 104 of slightly larger diameter at the other end of the portion 102. Also it is desired to provide each spool with a central aperture 105 extending through the cylindrical portion 102, and with apertures 106 and 107 extending through the flange 103.

The mold for molding these spools, in the present embodiment, is of the form best shown in Figs. 17 to 23 inclusive. It comprises the mold member 76 previously mentioned which is mounted stationarily on the frame of the machine and which is provided with the inlet orifice already described. In addition to this stationary mold member, there are certain movable mold members including a lower member 110 and an upper member 111 (Figs. 19 to 21) movable in a generally vertical direction, and a member 112 movable in a generally horizontal direction.

The members 110 and 111 slide up and down along the face of the member 76 and mate with each other to define the peripheries of the flanges 103 and 104 on the spools, and to fill in the space between these flanges. The stationary mold member 76 defines the outer faces of the flanges 104, while the mold member 112 defines the outer faces of the flanges 103 except at the centers thereof, where they are defined by a pair of movable ejecting plugs 113 slidable in the member 112. A pin 114 acts as a core to form the central opening 105 through each spool, while other pins 115 and 116 core out the openings 106 and 107 through the flanges 103.

As previously mentioned, the mold is relatively unheated so that the cellulose acetate or other suitable organic plastic material will be rapidly solidified and ready for quick ejection. In many instances, it may be sufficient simply not to heat the mold parts, as it is found they will remain sufficiently cool by radiating any heat imparted to them by the hot plastic material. In other instances, it is found desirable actually to cool the mold parts by cold water or other suitable cooling agent, which may be circulated, for example, through passageways 120 in the mold member 112, the cooling agent being led to and from the passageways 120 by suitable hose connections 121.

In closing the mold ready for a molding operation, the members 110 and 111 are preferably closed first, and then the member 112 is brought up against them to its closed position, so that it forcibly holds the members 110 and 111 tightly against the mold member 76. The mechanism for moving these mold parts to and from closed position will now be described, with special reference to Figs. 8, 9, and 24 to 28 inclusive.

The upper mold member 111, shown in its open position in Figs. 8 and 24 and in its closed position in Figs. 9 and 28, is secured somewhat loosely to a yoke 130 having vertical side portions 131 movable up and down in guideways in a frame member 132. This yoke is in the general form of a rectangle and has guideways formed along its inside edges so that a slide 133 inside the yoke may move up and down along these guideways. The lower mold member 110 is secured also somewhat loosely to the slide 133. Hence the mold member 110 may be shifted by moving the slide 133 in the guideways of the yoke 130—131, while the upper mold member 111 may likewise be moved by moving the whole yoke 130—131 along the guideways of the frame 132. Both mold members 110 and 111 have sufficient play relative to their respective members 130 and 133 so that these mold members may be pressed tightly against the mold member 76 by the action of the member 112, without causing stress in the members 130 and 133.

The upper end 130 of the yoke has a piston rod 134 connected thereto which extends into and is connected to a piston in a fluid pressure cylinder 135. Preferably the upper end of the cylinder is vented to the atmosphere and fluid pressure is constantly maintained in this cylinder beneath the piston, so that it tends to hold the yoke 130 in its uppermost position as illustrated in Fig. 24. By pulling downwardly on the yoke with a force greater than the lifting force of the cylinder 135, however, the entire yoke may be moved downwardly readily.

Fixed to a cross piece 136 at the bottom of the yoke 130—131 is another fluid pressure cylinder 137 having a piston rod 138 connected to the slide 133. The cylinder 137 is of slightly larger diameter than the cylinder 135, so that if the same pressure per square inch be used the cylinder 137 will exert somewhat greater force than the cylinder 135.

To close the mold parts 110 and 111, from the open positions shown in Figs. 8 and 24, fluid pressure is admitted to the lower part of the cylinder 137, so that the piston rod 138 of this cylinder tends to rise. This shoves upwardly on the slide 133 and carries the lower mold part 110 up until a suitable shoulder or stop portion on the mold part 110 or the slide 133 strikes a suitable stop or abutment mounted in stationary position on the frame of the machine to arrest further upward movement. The mold and slide may be conveniently formed so that the top of the slide 133 and a ledge on the mold portion 110 contact with the bottom edge of the stationary mold portion 76 to arrest upward movement, as shown in Figs. 9 and 19. Then, when the slide 133 can no longer move upwardly along the yoke 130—131, the continuing pressure in the cylinder 137 causes the cylinder itself to react downwardly, and since this cylinder is of greater force than the supporting cylinder 135, the yoke 130—131 is drawn downwardly against the supporting action of the cylinder 135 and the upper mold portion 111 is pulled down from the open position shown in Figs. 8 and 24 to the closed position shown in Figs. 9, 19, and 28. When the fluid pressure within the cylinder 137 is released, the continuing pressure in the supporting cylinder 135 will draw the yoke 130—131 up again to its initial position shown in Fig. 24, while the slide 133 and its mold member 110 will drop to their initial position shown in the same figure. Thus the cylinder 135 acts as a resilient support permitting the yoke 130—131 to be drawn downwardly but always tending to restore it to its uppermost position.

When fluid pressure means such as pneumatic cylinders are employed for operating the parts as above described, it is preferable also to provide positive locking means so that the great pressures used in introducing the plastic material into the mold will not force the mold open. Such positive locking means in the present instance comprises wedge means constructed as best shown in Figs. 8, 9, 25, and 26.

The yoke 130—131 has a bracket or extension 140 secured thereto and extending laterally therefrom to ride up and down bodily with the movements of the yoke, and this bracket in turn carries a fluid pressure cylinder 141 having a piston rod 142 connected to a wedge 143. Suitable bearing blocks 144 are provided on the bracket 140 on which the bottom of the wedge 143 may rest and slide. The upper edge of the wedge 143 is inclined and cooperates with a suitable inclined surface 145 formed on a bearing block 146 at the upper edge of an aperture 147 extending through the slide 133.

When the mold members are in their open position, the wedge is retracted to its ineffective position shown in Figs. 8 and 25. When the mold members have been closed, however, by the downward movement of the yoke 130—131 and by the upward movement of the slide 133, then the wedge 143 is opposite the aperture 147 and the fluid pressure cylinder 141 is operated to thrust the wedge 143 forwardly through the aperture to the position shown in Figs. 9 and 26. In this position, the tapered wedge thrusts downwardly on the bearing blocks 144 and hence downwardly on the yoke 130—131, while it thrusts upwardly on the block 146 and consequently on the slide 133. This positively locks the parts together, holding the mold portions 110 and 111 positively against any possible displacement due to the pressures within the mold, so that the mold will not become distorted or prematurely opened while in use, and articles of high quality, made in the correct undistorted shape, will be produced.

The horizontally movable mold member 112 is preferably also moved by fluid pressure means. Referring now especially to Figs. 8 and 9, this member 112 is mounted at the left hand end of a suitable slide member 150 which is slidable horizontally along guideways in the frame of the machine. The right hand end of the slide member 150 is secured to a piston rod 151 extending into and connected to a piston within a fluid pressure cylinder 152. By applying fluid pressure to one side or the other of the piston within the cylinder, the slide 150 may be moved back and forth to carry the mold member 112 from the open position shown in Fig. 8 to the closed position shown in Fig. 9 or vice versa.

Preferably there is a loose or floating connection between the slide 150 and the piston rod 151. For example, the end of the piston rod may have a head or enlargement 153 on its end, received loosely in a cavity in the cap or block 154 secured to the end of the slide 150. The parts are so proportioned that when the piston rod is thrust out to the extreme limit of its motion, it shoves the slide 150 only far enough to bring the mold part 112 loosely against the sides of the mold parts 110 and 111, without exerting any substantial pressure against them. But due to the floating connection, the slide 150 is capable of a slight additional motion, under the influence of the wedge locking means described below, in order to force the mold member 112 tightly against the members 110 and 111.

Positive locking means is also provided in connection with this mold member 112, as well as in connection with the mold members 110 and 111. This positive locking means also may be in the form of a wedge operated by fluid pressure. A cylinder 155 secured to a bracket 156 mounted on the frame of the machine is provided with a piston rod 157 having a wedge 158 secured thereto and slidable substantially vertically along bearing blocks 159 mounted in stationary position relative to the frame. The inclined face of the wedge 158 cooperates with an inclined face 160 on the bearing block 161 mounted in an aperture in the slide member 150. When the slide member is moved to bring the mold member 112 almost to the closed position shown in Fig. 9, the bearing block 161 is in suitable position so that operation of the cylinder 155 to thrust the wedge 158 upwardly as shown in Fig. 9 will cause the wedge to press rightwardly on the stationary bearing blocks 159 and leftwardly on the slide bearing block 160, so as to force the mold member 112 tightly against the mold members 110 and 111 and hold it in this position. This pulls the right hand end of the slide 150 slightly away from the head 153 on the piston rod 151, but such motion is permitted because of the loose or floating connection between these parts, the cavity in the cap 154 being larger than the size of the head 153.

This forcing of the mold member 112 against the members 110 and 111 not only makes a close contact to prevent leakage between the member 112 and the members 110 and 111, but also forces the latter members tightly against the mold member 76 to provide a tight joint at this point and to prevent leakage. It is desired, nevertheless, to provide supplementary sealing means at the inlet orifice of the mold to prevent any possibility of leakage of the plastic material at the joint between the member 76 and the members 110 and 111.

Such supplementary sealing means, as best shown in Figs. 11, 17, and 21, may comprise an annular flange 163 surrounding the inlet orifice 75 and projecting inwardly from the face of the mold member 76 and preferably formed integrally as a part of this mold member. The adjacent parts of the mold members 110 and 111 are formed to fit tightly against this flange 163 when the mold is closed, and the tight engagement of these parts, especially at the sharp corners or edges with which the flange 163 and the mold members are provided, produces an effective seal preventing any possibility of leakage of the plastic material between the stationary mold members and the movable mold members as the material enters the mold from the nozzle under high pressure.

The mechanism for ejecting the molded articles from the mold may be of any suitable form, such as that best shown in Figs. 19, 20, and 23. As previously mentioned, there is a movable plug 113 slidably mounted in the mold member 112 substantially at the center of each spool to be molded, there being two such plugs in the present instance since two spools are molded at one operation of the machine. These plugs 113 are fixed in a cross member 165 movable in a cavity in the mold member 112 and in the general shape of the letter H, as shown in Fig. 23. The vertical arms at the sides of the member 165 have rods 166 secured thereto and extending rightwardly therefrom through apertures in the member 167 secured to the right hand face of the mold member 112. The rods 166 have coiled springs 168 surrounding them which press against the member 167 and against heads on the rods 166 so that they tend to draw the member 165 rightwardly relative to the mold member 112 and thus to hold the ejecting plugs 113 at the rightward limit of their movement, which is the position illustrated in Figs. 9, 17, and 19. When the mold is opened after each filling of the mold with plastic material, by rightward movement of the slide 150 as above described, then the ends of the rods 166 move into contact with abutments 169 and 170 (Figs. 8 and 20) fixed relative to the frame of the machine, so that these rods 166 are shoved leftwardly relative to the mold member 112 against the action of the springs 168. This causes the ejecting plugs 113 to project out from the face of the mold member 112 and to strip the molded spools from the core pins 114 on which the spools had previously been supported during the opening movement of the mold. This same movement of the ejecting plugs 113 also strips the spools from the core pins 115 and 116 which, as plainly shown in Figs. 19 and 20, are provided with springs 175 and 176, respectively, so that the ends of the pins are held tightly against the cooperating faces of the mold members 110 and 111 when the mold is closed, as illustrated in Fig. 19.

At the same time that the ejecting plugs 113 are forced outwardly from the face of the mold 112 during the opening movement of the mold, the molded articles come directly under supplementary ejecting means in the form of a stream of fluid issuing from a nozzle 180 (Fig. 1) and supplied with air or other suitable fluid under pressure through a hose 181. In case the spools should have any tendency to stick to the faces of the ejecting plugs 113, the blast of air or other fluid from the nozzle 180 will dislodge them and cause the molded articles to drop by gravity into any suitable receptacle.

Once the articles have been ejected from the machine, the gate portions 100 and 101 may be removed in any suitable manner. This may be done, for example, by hand, or by tumbling a quantity of molded spools in a tumbling barrel or cylinder. The mold is preferably so shaped that the connections between the gate portion 101 and cylindrical portions 102 of the spools are relatively thin and may be easily broken right at the peripheries of the portions 102.

The mechanism for controlling the machine and operating the various fluid pressure cylinders in proper timed relation to each other may be of various forms, but preferably comprise a control or cam shaft 200 (Figs. 2 and 28) at the rear of the machine and driven at suitable speed through a sprocket 201 which is preferably driven from a variable speed drive. Preferably a clutch is interposed between the sprocket and driving shaft so that operation of the machine may be discontinued whenever desired, but the clutch preferably is so arranged that the shaft will always stop in a predetermined position in which the mold is open. For example, the clutch may be constructed as shown in Figs. 3 and 4, a collar 202 being fixed to the shaft 200 and having a pin 203 therein provided with a spring 204 tending to press the pin longitudinally of the shaft 200 and into any one of a series of cavities 205 in the adjacent face of the sprocket 201. Hence no matter what position the sprocket may be in when the clutch is closed, the clutch will quickly pick up the shaft 200 and commence to move it since the pin 203 will seat itself in the next cavity 205 of the sprocket without having to wait for a complete revolution thereof. But when the clutch is to be disconnected, this can be done only by a wedge portion 206 on the end of a lever 207 pivoted to the frame at 208, which wedge portion may contact with a lug 209 on the pin 203 at a certain point in the rotation of the clutch so as to withdraw the pin from the socket 205 on the sprocket and thus to disconnect the sprocket from the shaft.

The shaft 200 carries a plurality of controlling members, which may for convenience be termed cams. Four such members are shown in Fig. 2, being designated from right to left by the respective numerals 211, 212, 213, and 214. Each of them comprises a wheel fixed to the shaft 200 and having a T-slot 215 extending circumferentially around its periphery, as best shown in Fig. 29. Each wheel carries a pair of contact members 216 secured to the periphery of the wheel by bolts 217 extending into the T-slot 215, and adjustable rapidly and easily to various positions around the wheel by loosening the bolts 217.

These contact members 216 are arranged so that during rotation of the shaft 200 they will contact with and operate the arms 220 of a star wheel operatively connected to a fluid control valve. Four such control valves are employed in the present instance, one operated by each cam wheel, the respective valves being designated in Fig. 2 from right to left by the numerals 221, 222, 223, and 224.

The control valves 221 to 224 may be rotatable plug valves of the type diagrammatically shown in Figs. 30 and 31, being four-way valves with two passageways through each valve plug and four ports in each valve body. The air inlet and exhaust ports are indicated by suitable legends in Figs. 30 and 31 and the pipes leading from the other two ports of the valve body to the two ends of a cylinder are also indicated diagrammatically in these figures. It will be readily seen that when the valve is in one position, such as shown in Fig. 30, the air inlet port is connected to one end of the cylinder while the other end of the cylinder is connected to the air exhaust port. If the valve be turned 90° from this position to the position shown in Fig. 31, then the air inlet port is connected to the opposite end of the cylinder, while the first end of the cylinder is then connected to the exhaust port. A further movement of 90° of the valve connects the ports exactly the same as first described in connection with Fig. 30, and so on.

When a valve of this type is used, the star wheels 220 for operating such valves may each have four arms, as shown especially in Fig. 28. One of the contact members 216 on the associated cam wheel will contact with one of the arms of the star wheel 220 and shift it to a certain position. Then as the cam wheel continues its rotation, the other contact member 216 will contact with the next arm of the star wheel and move the valve 90° to its next position. Then on continued rotation, the first contact member will contact with the third arm of the star wheel and move the valve another 90° to bring the fluid connections back to their previous position, while continued movement will cause the other contact member to contact with the fourth arm of the star wheel and give the valve another rotation through 90°.

Fig. 32 shows diagrammatically the shaft 200 and the cam wheels 211 to 214 inclusive thereon and illustrates the relative positions of the various contact members on the cam wheels. Fig. 33 illustrates diagrammatically the valves and the piping connections to the various cylinders. There is provided a fluid pressure reservoir 230 to which compressed air or other suitable fluid under pressure is supplied by an air compressor or pump, so that the pressure within the reservoir is maintained substantially constant. This reservoir is connected by suitable pipes to the inlet port of each valve casing. The exhaust port of each valve casing is connected to a suitable exhaust conduit 231.

The control valve 221 has a connection 232 leading from one of its ports to the left hand end of the feeding cylinder 66, a check valve 233 and a needle valve 234 being placed in parallel with each other in the supply line 232, so that fluid may flow freely to the cylinder through the check valve, but may leave the cylinder only relatively slowly through the needle valve. Another conduit 235 leads from the other port of the valve 221 to the opposite end of the cylinder 66.

The control valve 222 has one of its ports connected to a conduit 236 having one branch 237 leading to the wedge cylinder 155, another branch 238 leading to the wedge cylinder 141, and a third branch 239 leading to the nozzle valve cylinder 92. A conduit 240 leads from the other port of the control valve 222 to the opposite end of each of these three cylinders 155, 141, and 92, needle valves 241 and 242 being interposed in the branches leading to the cylinders 155 and 141, but not in the branch leading to the cylinder 92.

From the control valve 223 there is a conduit 243 leading to the lower end of the cylinder 137 which controls the upper and lower mold parts 110 and 111. Another conduit 244 extends from this same control valve 223 through a needle valve 245 to the upper end of the same cylinder 137. A conduit 246 runs direct from the reservoir 230 to the lower end of the supporting cylinder 135 for the mold parts 110 and 111, so that pressure is constantly kept on the lower end of this cylinder, and the upper end thereof is vented to the atmosphere.

From one port of the control valve 224 there is a conduit 250 having a branch 251 leading to the right hand end of the horizontal slide cylinder 152, a check valve 253 and a needle valve 254 being placed in parallel with each other in this branch 251, so that fluid may flow freely to the cylinder through the check valve, but must return more slowly through the needle valve. Thus the mold will be closed quickly, but will be opened more slowly so that the molded article will not be damaged and will not be torn loose from the gate portion. Another branch 255 from the same conduit leads to the bottom of the cylinder 51 which controls the vertical feeding plunger 49. Still another branch 256 from the same conduit 250 leads through a check valve 257 to a poppet valve 258 and thence to the ejecting nozzle 180. The poppet valve 258 is operated by an arm 259 so positioned that when the horizontal slide 150 is moved rightwardly, it contacts near the end of its movement with the arm 259 and opens the valve to allow the fluid to escape through the ejecting nozzle 180. A small reservoir 260 is also attached to the conduit 256 between the check valve 257 and the valve 258.

From the other side of the control valve 224, there is a conduit 261 having one branch leading through a needle valve 262 to the left hand end of the cylinder 152, and another branch 263 leading to the upper end of the vertical feeding plunger cylinder 51.

The operation of each individual part of the apparatus has been set forth above in connection with the description of each part. The operation of the machine as a whole will now be explained, first referring to the cam diagram in Fig. 32, which illustrates the parts in the position of rest in which they would stop when the clutch on the shaft 200 is opened.

When the clutch is closed so that the shaft 200 commences to rotate, it rotates in a clockwise direction when viewed as in Fig. 32. From the relative angular placement of the valve contact members 216, it will be seen that one of the contact members on the cam wheel 213 will be the first to trip its star wheel 220, which controls the valve 223. This will move this valve to the position indicated in Fig. 33, supplying fluid to the bottom of the cylinder 137. This cylinder, in turn, will shove upwardly on the vertical slide 133 until this slide and the lower mold part 110 contact with the bottom of the mold portion 76, and then this same cylinder will cause a downward movement of the yoke 130—131 so that the upper mold part 111 is pulled down into mating engagement with the mold part 110, overcoming the resilient supporting action of the cylinder 135.

Next, one of the contact members on the cam wheel 214 will hit the star wheel of its associated control valve 224 and turn this valve to the position indicated in Fig. 33. This has the triple effect of supplying air to the bottom of the vertical feeding plunger cylinder 51 to raise this plunger to its upper position shown in Fig. 7, and of supplying fluid to the right hand end of the horizontal slide cylinder 152 to cause the slide 150 to move leftwardly, and of supplying fluid to the conduit 256 and reservoir 260 to be stored therein. The leftward movement of the slide 150 moves the horizontally movable mold part 112 up into loose substantial contact with the right hand side of the mold parts 110 and 111 which have just previously been moved to their closed position, but does not press tightly against them.

A slight further rotation of the shaft 200 brings one of the contact members on the cam wheel 212 into contact with the star wheel of the control valve 222, to move this valve to the position indicated in Fig. 33. This has the effect of supplying fluid substantially simultaneously to the left hand end of the wedge cylinder 141 and the bottom of the wedge cylinder 155, so that both these wedges are driven home to their wedging or locking position to hold the mold parts securely locked. The wedge 158 produces a slight additional movement of the horizontal slide 150, permitted by the loose floating connection between 150 and 151, to force the mold part 112 tightly against 110 and 111 and to press the latter tightly against 76. At the same time, fluid is also supplied to the rear end of the nozzle valve cylinder 92, to thrust the piston rod thereof outwardly to open the nozzle valve 80.

Next, when all of the mold parts have been closed and securely locked in position as above described, one of the contact members on the cam wheel 211 hits the star wheel of its control valve 221 and moves this valve to the position indicated in Fig. 33. This supplies air rapidly through the check valve 233 to the left hand end of the main feeding cylinder 66, causing the main feeding plunger 65 to move rightwardly through the plastic material chamber 56. The first part of this movement moves the entire chamber and its block 57 slightly rightwardly to force the nozzle 71 into the filling orifice 75 with sufficient pressure to compress and contract the nozzle slightly as previously mentioned.

Further movement of the plunger 65 through the chamber 56 results in forcing the plastic material out through the nozzle and filling orifice and into the mold. The main feeding cylinder 66 is of large diameter so that great force is placed upon the feeding plunger and the plastic material is forced into the mold under high pressure. The relatively restricted size of the nozzle as well as the heating of the chamber for the plastic material both cooperate in insuring that the plastic material is in the proper fluid condition when it enters the mold. Thus the plastic material will be forced fully into all parts of the mold, by reason of the fact that it is fluid and under high pressure, so that no voids will be left in the mold and perfect articles will be produced.

Upon continued rotation of the control shaft 200, the next operation is that the second contact member 216 on the plunger cam wheel 211 contacts with a star wheel arm on the control valve 221 and turns this valve 90° from the position indicated in Fig. 33. This connects the conduit 235 to the source of pressure, and the conduit 232 to the exhaust conduit 231. The main feeding plunger 65 operated by the cylinder 66 then moves back or leftwardly, but is cushioned during this movement because the air from the opposite end of the cylinder can escape only relatively slowly through the needle valve 234.

The mold is still locked in closed position by the wedges for a time after the plunger 65 begins to move back, and the plastic material is held in the mold during a considerable part of each cycle of operation so that it has ample time to solidify sufficiently before the mold is opened. Only after the control shaft 200 has turned a considerable distance further, as will be readily seen from the diagram, Fig. 32, does the second contact member 216 on the cam wheel 212 operate the valve 222 to turn it 90° from the position shown in Fig. 33. This connects the conduit 236 to the exhaust 231 and the conduit 240 to the pressure reservoir 230. The fluid pressure flowing in the conduit 240 acts immediately on the cylinder 92, which has no needle valve associated therewith, to operate this cylinder to close the nozzle valve 80. Also, but more slowly, the pressure passes through the needle valves 241 and 242 to operate the wedge cylinders 155 and 141 to withdraw both of the wedges and thus to unlock the mold. When the wedge 158 is withdrawn, the mold member 112 is thereby loosened sufficiently so that it will not cause undue friction on the members 110 and 111 when they are subsequently opened.

Very shortly after the operation of the valve 222, the second contact member on the cam wheel 213 operates the valve 223 to move it 90° from the position indicated in Fig. 33. This connects the conduit 243 to the exhaust conduit 231, and the conduit 244 to the pressure reservoir. The pressure flows relatively slowly through the needle valve 245 and moves the piston of the cylinder 137 downwardly, which not only moves the lower mold part 110 downwardly, but also permits the constant pressure within the supporting cylinder 135 to move the upper mold part 111 upwardly to the open position illustrated in Fig. 8.

It will be noted that when the mold is closed, the parts 110 and 111 are moved before the part 112, so that the latter does not cause any friction impeding 110 and 111 in closing. When the mold is opened, 110 and 111 are moved first, while 112 is still in closed position, but no substantial friction is caused at this time by 112 because, when the wedge 158 is withdrawn, 112 is permitted by the loose connection 153—154 to move back slightly so that it exerts no substantial pressure against 110 and 111.

Finally, still further rotation of the shaft 200 causes the second contact member 216 on the cam wheel 214 to operate the valve 224 through 90° from the position shown in Fig. 33, so that the conduit 250 is connected to the exhaust conduit 231 and the conduit 261 is connected to the pressure supply reservoir. Through the needle valve 262, pressure flows into the lefthand end of the horizontal slide cylinder 152, causing rightward movement of the horizontal slide 150 and a consequent rightward movement of the mold part 112. As this movement continues, the rods 166 associated with the mold part 112 hit the abutments 169 and 170 (Fig. 20) to force the ejecting plugs 113 outwardly so as to strip the molded articles from the core pins 114, 115, and 116. Also, at the same instant, a suitable part of the slide 150 strikes the lever 259 (Fig. 33) of the poppet valve 258, so that this valve is opened and the compressed air stored in the conduit 256 and reservoir 260 is suddenly let out through the ejecting nozzle 180 so that it impinges upon the molded articles and assists in displacing them from the mold if they have any tendency to stick.

At the same time that this retraction of the horizontal slide 150 is going on, the pressure also runs through the conduit 263 to the upper end of the vertical plunger cylinder 51, causing the feeding plunger 49 (Fig. 7) to move downwardly to feed an additional supply of the molding material down toward the bottom of the chamber 48 where it will become heated by the heater 55 preparatory to flowing into the main plastic holding chamber 56 ready for the next molding operation.

If the clutch shown in Figs. 3 and 4 is opened, the machine will stop at this point at the end of its cycle, but if the clutch remains closed, the same cycle will be repeated over and over again, the vertically movable mold parts 110 and 111 first being closed, then the mold part 112 being brought against them, then the mold being locked by the wedges, then the plastic material being injected therein under pressure, and so on, all as previously described in detail.

As already indicated, it is found in many instances that the nozzle valve 80 is not necessary, and may be entirely omitted from the apparatus, together with its operating cylinder 92. When it is employed, however, it may be constructed and operated as above described.

The fluid pressure cylinders of the machine are preferably operated by compressed air, but it should be understood that any suitable operating fluid, whether liquid or gas, may be employed within the contemplation of this invention.

As before stated, it is important in a machine of this character to have the time of operation of each part of the machine exactly right, so that the various operations will blend harmoniously. The heating of the molding material should take place at the proper rate, depending upon the rate at which it is used. The time of holding the mold closed, the duration of the injection pressure, and the rate at which the mold is opened, are all important and should all be varied as necessary in accordance with the characteristics of the molding material and of the molded article. One of the main features of the present machine is its adaptability in these respects. The molding material heaters 55 and 58 may be individually regulated. The timing of each individual step or operation of the machine may be regulated and adjusted minutely by changing the position of the cams 216 on their respective cam wheels, and by adjusting the various needle valves such as 234, 241, 242, etc. The timing or duration of each cycle of operation as a whole may be varied by adjusting the variable speed drive which drives the sprocket 201 on the cam wheel shaft 200. Thus, within reasonable limits, the machine may be made to operate with any desired timing and at any desired rate.

It should also be understood that the present machine is designed and adapted for molding a wide variety of organic plastic materials, of which cellulose acetate has been mentioned as an example. The term "organic" as used in the specification and claims is intended to include any material mainly organic in character as distinguished from materials mainly metallic or otherwise inorganic, even though such organic material may have more or less inorganic material mixed or included therewith.

The mold parts and their operating mechanism have been described above by way of example in an embodiment especially suitable for molding winding spools or bobbins. For molding other articles, suitable modifications may be made in the mold parts, the operating mechanism, or both. For instance, in some cases either the horizontal mold movement or the vertical mold movement may be unnecessary. The cam members 216 controlling the particular movement which is unnecessary may then be removed from the machine, so that the associated control valve will not be shifted and the undesired movement will not take place. In some cases one or more of the available motions might be used to furnish additional clamping or locking power to the others. Thus it is seen that the present machine has great flexibility and may be used for the molding of a wide variety of articles.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Apparatus for molding articles from organic plastic material, comprising a chamber for supplying molding material having a discharge nozzle tapered externally to contract and internally to expand toward its discharge end, means for heating said chamber to render said material fluent, a substantially unheated mold having an internally tapered filling orifice, means for moving said nozzle and orifice relatively toward each other and for discharging said material therethrough to fill said mold, and means for closing said mold to receive said material and for opening said mold to discharge a molded article therefrom.

2. Molding apparatus comprising a chamber for supplying molding material having a discharge orifice, a frame, a sectional mold comprising two sections each movable relatively to said frame in a direction opposite to the movement of the other section for opening and closing said mold, fluid pressure cylinder and piston means including a cylinder operatively connected to one of said sections and a piston operatively connected to the other of said sections for moving first one of them in one direction and then the other of them in the opposite direction to close said sections, and means for discharging said material from said chamber through said orifice into said mold to fill the same.

3. Molding apparatus comprising a frame, a yoke movable relatively to said frame, a slide movable on said yoke, a sectional mold comprising two sections, one mounted on said yoke and the other mounted on said slide, and means interposed between said yoke and slide for moving said slide in one direction to a predetermined position and moving said yoke in an opposite direction to close said mold sections.

4. Molding apparatus comprising a frame, a yoke movable relatively to said frame, a slide movable on said yoke, a sectional mold comprising two sections, one mounted on said yoke and the other mounted on said slide, means interposed between said yoke and slide for moving the said slide in one direction to a predetermined position and moving said yoke in an opposite direction to close said mold sections, and wedge means mounted on said yoke and movable bodily therewith for wedging said yoke and slide relatively to each other to hold said mold sections in closed position.

5. Molding apparatus comprising a movable yoke, resilient means tending to hold said yoke in predetermined position, a slide movable on said yoke, a sectional mold including two sections, one mounted on said yoke and the other mounted on said slide, means for limiting movement of said slide in one direction, and means operatively interposed between said slide and yoke for moving said slide in said direction to the limit of its movement and for then moving said yoke in an opposite direction against the action of said resilient means to close said mold sections.

6. Molding apparatus comprising a chamber for supplying molding material having a discharge nozzle externally tapered to contract toward its discharge end and having relatively thin walls adjacent said discharge end capable of being slightly flexed and contracted under substantial pressure, a mold having an internally tapered filling orifice, means for forcing said nozzle into said orifice thereby to contract said nozzle and for discharging said material from said chamber through said contracted nozzle into said mold, and means for retracting said nozzle from said orifice to release said nozzle for expansion to free the molding material remaining within said nozzle.

7. Molding apparatus comprising a chamber for supplying molding material, said chamber having associated therewith a relatively restricted discharge nozzle tapered externally to contract and internally to expand toward its discharge end and having relatively thin resilient walls adjacent said discharge end, a mold having an internally tapered filling orifice adapted to receive said nozzle, resilient means tending to retract said nozzle from said orifice, and means for intermittently forcing said nozzle into said orifice against the action of said resilient retracting means to cause said discharge end of said nozzle to contract and for discharging molding material through said contracted nozzle into said mold.

8. In a molding apparatus, a sectional mold comprising two opposed sections movable relatively toward and from each other and having cavities in their adjacent faces for receiving molding material, another mold section lying closely adjacent said opposed sections when the latter are in closed position and having a filling orifice communicating with said cavities, pressure means for forcing molding material into said cavities through said orifice, and an inwardly extending flange on said other section surrounding said orifice and projecting into said opposed sections to reduce leakage of molding material from the mold.

9. Molding apparatus comprising a chamber for supplying molding material, a frame, a sectional mold comprising two sections each movable relatively to said frame, a fluid pressure cylinder movable relatively to said frame and operatively connected to one of said mold sections to move the mold section relatively to the frame, a piston movable within said cylinder and operatively connected to the other of said mold sections, means for supplying fluid under pressure to said cylinder to cause said cylinder and said piston to move relatively to each other and both of them to move relatively to said frame to close said mold sections, and means for discharging molding material from said chamber into the closed mold.

10. A continuous, spray-molding apparatus for molding articles of plastic material comprising a chamber for supplying molding material provided with heating means and a restricted discharge orifice, a mold capable of being opened and closed and having a restricted filling orifice, fluid pressure means for partially closing said mold, spraying fluent material from said chamber through said orifices under high pressure to fill said mold when closed, and opening the mold to eject the molded article, control mechanism for causing operation of said fluid pressure means to partially close and to fill and open the mold automatically in predetermined timed sequence, and in automatically repeated cycles, and means for varying the action of said timed sequence of operation of said control mechanism, and locking means automatically operable to fully close said mold and for holding said mold closed.

11. A continuous, spray-molding apparatus for molding articles of plastic material comprising a chamber for supplying molding material having a restricted discharge orifice, means for feeding material to said chamber, means for heating said material in said chamber between said feeding means and said orifice, a mold having a restricted filling orifice, fluid pressure means for opening and for partially closing said mold, and means for completing the closing of said mold and for locking said mold in its closed position, fluid pressure means for spraying material from said chamber through said orifices into said mold under high pressure to fill the same, and common control mechanism for automatically operating all of said fluid pressure means and said means for completing the closing of said mold and locking the same in closed position in predetermined timed relation with each other and in uniformly recurring cycles.

12. A spray-molding apparatus for molding articles of organic plastic material comprising a chamber for supplying molding material having a heating means and a restricted discharge nozzle, a sectional mold having a restricted filling orifice adapted to receive said nozzle, yieldable fluid pressure means for opening and for partially closing said mold, separate positive means for completing the closing of said mold and for locking said mold in its closed position, and means for moving said nozzle into said orifice and for spraying material from said chamber through said orifices under high pressure into said mold when closed to fill the same.

13. A spray-molding apparatus comprising a chamber for supplying molding material having heating means and a restricted discharge nozzle, a sectional mold having a restricted filling orifice adapted to receive said nozzle, yieldable fluid pressure means for opening and for partially closing said mold, separate wedge means for completing the closing of said mold and for locking said mold in its closed position, and means for moving said nozzle and said orifice relatively toward and from each other for spraying material from said chamber through said orifices under high pressure into said mold when closed to fill the same.

14. A continuous spray-molding apparatus comprising a chamber for supplying molding material having a restricted discharge orifice, a sectional mold having a restricted filling orifice, fluid pressure means for opening and for partially closing said mold, wedge means for completing the closing of said mold and for locking said mold in its closed position, fluid pressure means for operating said wedge means, fluid pressure means for spraying material from said chamber through said orifices under high pressure into said mold when closed to fill the same, and common control mechanism for causing operation of all of said fluid pressure means in predetermined uniformity recurring timed sequence.

15. A spray molding apparatus for molding articles from organic plastic material comprising a chamber for supplying molding material having feeding means and a restricted discharge orifice, heating means for said chamber between said feeding means and said orifice for plasticizing said material, a sectional mold having a restricted filling orifice and a plurality of mold sections movable in different directions at an angle to each other to close and open the mold, yieldable means for moving said sections successively to partially closed position, separate means acting subsequently and simultaneously on all of said sections for moving at least one of said sections into fully closed position and for positively locking them in closed position, and means for spraying said material from said chamber through said orifices under high pressure into said mold when closed to fill the same.

16. A spray-molding apparatus comprising a chamber for supplying molding material having a restricted discharge orifice, a sectional mold having a restricted filling orifice and a plurality of mold sections movable in intersecting planes to closed position, operating means for moving said sections including a loose connection with one of said mold sections for moving said section approximately to closed position, means for giving said one section an additional movement to fully closed position in close engagement with the others of said sections and for positively locking it in such position, and means for spraying said material from said chamber through said orifices under high pressure into said mold when closed to fill the same.

17. A spray-molding apparatus comprising a chamber for supplying molding material having a restricted discharge orifice, a sectional mold having a restricted filling orifice and a plurality of mold sections movable in intersecting planes to closed position, means for moving one of said sections to substantially closed position, operating means having a loose connection with another of said sections for moving said section into loose contact with said first section, positive means for giving said other section an additional movement independently of said operating means to force said other section tightly against said first section, and means for spraying said material from said chamber through said orifices under high pressure into said mold when closed to fill the same.

18. Molding apparatus comprising a mold having a restricted filling orifice, a chamber for holding molding material having a restricted discharge orifice for cooperation with said mold orifice, plunger means reciprocating in close fitting engagement in said chamber for injecting said fluent material under high pressure from said chamber through said orifices into said mold, means for heating said chamber between said plunger and said discharge orifice to render said material fluent for injection into said mold, a second chamber for holding said material communicating with said first chamber, an additional plunger reciprocating in close fitting engagement in said second chamber and in predetermined timed relation to said first plunger means for feeding said material from said second chamber into said first chamber, and a separately controlled heating means for said second chamber between said additional plunger and said first chamber.

19. A spray-molding apparatus for molding articles of organic plastic material comprising a sectional mold having a restricted filling orifice, yieldable fluid pressure means for opening and for partially closing said mold, positive locking means for completing the closing of said mold and for locking said mold in its closed position, fluid pressure means for operating said locking means, a chamber having a restricted discharge orifice for supplying molding material, plunger means in said chamber for spraying material through said orifices under high pressure into said mold when closed to fill the same, fluid pressure means for actuating said plunger means, and heating means between said plunger means and discharge orifice to render said material fluent adjacent said discharge orifice.

20. A spray-molding apparatus for molding articles of organic plastic material comprising a sectional mold having a restricted filling orifice, yieldable fluid pressure means for opening and for partially closing said mold, positive locking means for completing the closing of said mold and for locking said mold in its closed position, fluid pressure means for operating said locking means, a chamber having a restricted discharge orifice for supplying molding material, plunger means in said chamber for spraying material through said orifices under high pressure into said mold when closed to fill the same, heating means between said plunger means and discharge orifice to render said material fluent adjacent said discharge orifice, fluid pressure means for actuating said plunger means, valve means separately controlling each of said fluid pressure means, a rotatable shaft, and cam means adjustably mounted on said shaft for operating said valve means to close and lock said mold, discharge molding material thereinto, and unlock and open said mold during rotation of said shaft, according to a predetermined schedule depending upon the adjustment of said cam means on said shaft.

21. Spray-molding apparatus for molding articles of organic plastic material comprising a frame having mounted thereon a chamber having a restricted discharge orifice, plunger means for spraying material from said chamber through said orifice, material feeding means communicating with said chamber between said plunger and orifice, variable heating means for said chamber between said feeding means and orifice for progressively rendering said material fluent adjacent said orifice, a sectional mold having a restricted filling orifice cooperating with said discharge orifice, yieldable fluid pressure means for moving said sections to open and to partially close said mold, separately actuated positive wedge means for completing the closing movement of said sections and for locking said sections in closed position, and fluid pressure means for actuating said plunger means for filling said mold under high pressure when closed, said mold being locked so that the pressure of the injection will be received by the wedging locking means only and transmitted through the wedge to the frame.

22. Spray-molding apparatus for molding articles of organic plastic material comprising a chamber having a restricted discharge orifice, plunger means for spraying material from said chamber through said orifice, material feeding means communicating with said chamber between said plunger and orifice, variable heating means for said chamber between said feeding means and orifice for progressively rendering said material fluent adjacent said orifice, a sectional mold having a restricted filling orifice cooperating with said discharge orifice, yieldable fluid pressure means for moving said sections to open and to partially close said mold, wedge means for fully closing said mold and locking said sections in closed position, fluid pressure means for actuating said plunger means for filling said mold under high pressure when closed and locked, and yieldable fluid pressure means for actuating said wedge means.

HAROLD L. JEFFERY.